US007750908B2

(12) United States Patent
Kincaid et al.

(10) Patent No.: US 7,750,908 B2
(45) Date of Patent: *Jul. 6, 2010

(54) FOCUS PLUS CONTEXT VIEWING AND MANIPULATION OF LARGE COLLECTIONS OF GRAPHS

(75) Inventors: Robert Kincaid, Half Moon Bay, CA (US); Heidi Lam, Vancouver (CA)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/246,743

(22) Filed: Oct. 6, 2005

(65) Prior Publication Data

US 2006/0028471 A1 Feb. 9, 2006

Related U.S. Application Data

(63) Continuation-in-part of application No. 11/124,500, filed on May 6, 2005, which is a continuation-in-part of application No. 10/964,524, filed on Oct. 12, 2004, now abandoned, which is a continuation-in-part of application No. 10/817,244, filed on Apr. 3, 2004.

(60) Provisional application No. 60/460,479, filed on Apr. 4, 2003.

(51) Int. Cl.
*G06T 11/20* (2006.01)
*G09G 5/22* (2006.01)
(52) U.S. Cl. .................. 345/440; 345/440.1; 345/440.2
(58) Field of Classification Search .................. 345/440, 345/660, 440.1, 440.2
See application file for complete search history.

(56) References Cited

U.S. PATENT DOCUMENTS

| 3,599,033 | A | * | 8/1971 | Stettiner et al. | .............. 315/384 |
|---|---|---|---|---|---|
| 5,226,118 | A | * | 7/1993 | Baker et al. | ................. 715/833 |
| 5,228,119 | A | * | 7/1993 | Mihalisin et al. | ............ 345/418 |
| 5,530,373 | A | * | 6/1996 | Gibson et al. | ................ 324/758 |
| 5,632,009 | A | * | 5/1997 | Rao et al. | .................... 715/509 |
| 5,652,851 | A | * | 7/1997 | Stone et al. | ................. 715/804 |
| 5,684,507 | A | * | 11/1997 | Rasnake et al. | .......... 345/440.1 |

(Continued)

FOREIGN PATENT DOCUMENTS

WO     WO 93/18186     9/1993

OTHER PUBLICATIONS

Autio, et al. CGH-Plotor: MATLAB toolbox forcGH-data analysisd, Bioinformatices, vol. 19 No. 13 2003, pp. 1714-1715.*

(Continued)

*Primary Examiner*—Ulka Chauhan
*Assistant Examiner*—Jeffrey J Chow

(57) ABSTRACT

Methods, systems and computer readable media for visualizing a collection of graphs, wherein each of the graphs may be aligned along one axis of a visualization. All graphs are aligned with respect to the one axis. At least one metadata value per graph is aligned in a first form of representation with each graph, respectively. Visualization of the graphs are compressed in a direction along a second axis perpendicular to the first axis, and visualizations of the metadata values aligned with the compressed visualizations of the graphs are represented graphically.

31 Claims, 17 Drawing Sheets
(13 of 17 Drawing Sheet(s) Filed in Color)

U.S. PATENT DOCUMENTS

| | | | |
|---|---|---|---|
| 5,684,508 A * | 11/1997 | Brilman | 345/440.1 |
| 5,830,150 A * | 11/1998 | Palmer et al. | 600/523 |
| 5,860,917 A | 1/1999 | Comanor et al. | |
| 5,880,742 A | 3/1999 | Rao et al. | |
| 5,895,474 A * | 4/1999 | Maarek et al. | 715/514 |
| 5,929,842 A * | 7/1999 | Vertregt et al. | 345/690 |
| 5,948,902 A | 9/1999 | Konkanen et al. | |
| 5,966,139 A * | 10/1999 | Anupam et al. | 345/440 |
| 6,064,401 A * | 5/2000 | Holzman et al. | 345/440 |
| 6,085,202 A | 7/2000 | Rao et al. | |
| 6,171,797 B1 | 1/2001 | Perbort | |
| 6,180,351 B1 | 1/2001 | Cattell | |
| 6,188,783 B1 | 2/2001 | Balaban et al. | |
| 6,188,969 B1 | 2/2001 | Minor | |
| 6,219,052 B1 * | 4/2001 | Gould | 345/661 |
| 6,221,583 B1 | 4/2001 | Kayyem et al. | |
| 6,222,664 B1 | 4/2001 | Dorsel | |
| 6,232,072 B1 | 5/2001 | Fisher | |
| 6,237,006 B1 * | 5/2001 | Weinberg et al. | 707/103 R |
| 6,242,266 B1 | 6/2001 | Schleifer et al. | |
| 6,251,685 B1 | 6/2001 | Dorsel et al. | |
| 6,320,196 B1 | 11/2001 | Dorsel et al. | |
| 6,323,043 B1 | 11/2001 | Caren et al. | |
| 6,355,921 B1 | 3/2002 | Staton et al. | |
| 6,356,285 B1 * | 3/2002 | Burkwald et al. | 715/853 |
| 6,371,370 B2 | 4/2002 | Sadler et al. | |
| 6,406,849 B1 | 6/2002 | Dorsel et al. | |
| 6,410,243 B1 | 6/2002 | Wyrick et al. | |
| 6,486,457 B1 | 11/2002 | Dorsel et al. | |
| 6,518,556 B2 | 2/2003 | Staton et al. | |
| 6,525,746 B1 * | 2/2003 | Lau et al. | 715/725 |
| 6,628,312 B1 * | 9/2003 | Rao et al. | 715/853 |
| 6,711,577 B1 * | 3/2004 | Wong et al. | 707/101 |
| 6,776,342 B1 * | 8/2004 | Thuries et al. | 235/462.15 |
| 7,038,680 B2 * | 5/2006 | Pitkow | 345/440 |
| 2002/0004489 A1 | 1/2002 | Shi et al. | |
| 2003/0009295 A1 | 1/2003 | Markowitz et al. | |
| 2003/0065535 A1 * | 4/2003 | Karlov et al. | 705/2 |
| 2004/0095349 A1 * | 5/2004 | Bito et al. | 345/440 |
| 2004/0163039 A1 * | 8/2004 | Gorman | 715/505 |
| 2005/0027729 A1 * | 2/2005 | Kuchinsky et al. | 707/100 |
| 2005/0048569 A1 * | 3/2005 | Van Der Spek et al. | 435/7.1 |
| 2005/0068322 A1 * | 3/2005 | Falcioni | 345/467 |
| 2005/0228735 A1 * | 10/2005 | Duquette | 705/37 |
| 2006/0020398 A1 * | 1/2006 | Vernon et al. | 702/20 |

OTHER PUBLICATIONS

M. S. T. Carpendale, Catherine Montagnese. Papers: Information visualization'. "A framework for unifying presentation soace". Nov. 2001 . Proceedinns of the 14th annual ACM symposium on User inteface software and technology.*

Moore, et al.,"A t-statistic for Objective Interpretation of Comparative Genomic Hybridization (CGH)," Profiles, Cytometry, vol. 28, pp. 183-190, 1997.*

Pollack et al., "Microarray analysis reveals a major direct role of DNA copy number alteration in the transcriptional program of human breast tumors" PNAS, Oct. 1, 2002, vol. 99, No. 20, 12993-12968.*

Figure from www.firstcap.com, http://www.firstcap.com/fco2001.gif.*

Figure from www.kirin.co.jp, http://www.kirin.co.jp/english/annual2001/images/26info/26_graph.gif.*

Miller, Bill, "MatLab Training Course Notes: Session 3", http:://dnl.ucsf.edu/matlab/session3.html, Jun. 16, 2001.*

Pollack et al., "Microarray analysis reveals a major direct role of DNA copy number alteration in the transcriptional program of human breast tumors" PNAS, Oct. 1, 2002, vol. 99, No. 20, 12993-12968.

Hedenfalk et al.,"Molecular classification of familial non-BRCA1/BRCA2 breast cancer", PNAS, Mar. 4, 2003, vol. 100, No. 5, 2532-2537.

Ben-Dor et al., "Class Discovery in Gene Expression Data", Fifth Annual International Conference on Computational Molecular Biology, 2001, pp. 31-38.

Moore, et al.,"A t-Statistic for Objective Interpretation of Comparative Genomic Hybridization (CGH),"Profiles, Cytometry, vol. 28, pp. 183-190, 1997.

Wang, et al. "Statistical Methods for Detecting Genomic Alterations Through Array-Based Comparative Genomic Hybridization (CGH)," Frontiers in Bioscience, vol. 9, pp. 540-549, 2004.

Carothers, "A likelihood-based approach to the estimation of relative DNA copy number by comparative genomic hybridization," Biometrics, vol. 53, pp. 848-856, 1997.

Rohatgi, in Statistical Inference. Mineola, New York: Dover Publications, Inc., 2003, 4 pgs.

Fujii et al., "A Preliminary Transcriptome Map of Non-Small Cell Lung Cancer", Cancer Reserch 62, 3340-3346, Jun. 15, 2002.

Autio, et al. "CGH-Plotor: MATLAB toolbox forCGH-data analysis", Bioinformatics, vol. 19 No. 13 2003, pp. 1714-1715.

Chi, et al. "BMC Bioinformatics", SeeGH—A software tool for visualization of whole genome array comparative genomic hybridization data, http://www.biomedcentral.com/1471-2105/5/13Feb. 9, 2004, pp. 1-6.

Rao, et al. "The Table Lens: Merging Graphical and Symbolic Representations in an Interactive Focus+ Context Visualization for Tabular Information", Proceeding of the ACM SIGCHI Conference on Human Factors in Computings Systems, Bostom, MA, Apr. 1994, ACM. pp. 1-7.

Kincaid, et al. "VistaClara: An Interactive Visualization for Exploratory Analysis of DNA Microarrays", Mar. 14-17, 2004, Nicosia, Cypus. pp. 167-174.

Ben-Dor et al., "Tissue Classification with Gene Expression Profiles", J. Computational Biology, 2000, pp. 1-32.

Crawley, et al., "Identification of Frequent Cytogenetic Aberrations in Hepatocellular Carcinoma Using Gen-Expression Microarry Data," Genome Biol, vol. 3, pp. Research0075, 2002.

Ben-Dor, et al., "Analysis of Array Based Comparative Genomic Hybridization Data—Theory and Validation," pp. 1-10. Not dated.

Jong, et al. "Breakpoint Identification and Smoothing of Array Comparative Genomic Hybridization data," pp. 1-2, 2004.

Silicon Genetics, "Hierarchical Clustering: Tree Building", http://www.silicongenetics.com/cgi/SiG.cgi/Products/GeneSpring/predict.smf?, p. 1, downloaded Jul. 15, 2002.

Silicon Genetics, "k-means Clustering", http://www.silicongenetics.com/cgi/SiG.cgi/Products/GeneSpring/Kmeans.smf?, p. 1, downloaded Jul. 15, 2002.

Silicon Genetics, "Self-organizing Maps", http://www.silicongenetics.com/cgi/SiG.cgi/Products/GeneSpring/SOM.smf?, p. 1, downloaded Jul. 15, 2002.

Silicon Genetics, "Principal Components Analysis", http://www.silicongenetics.com/cgi/SiG.cgi/Products/GeneSpring/PCA.smf?, pp. 1-2, downloaded Jul. 15, 2002.

Silicon Genetics, "Regulatory Sequence Search", http://www.silicongenetics.com/cgi/SiG.cgi/Products/GeneSpring/RegSeq.smf?, p. 1, downloaded Jul. 15, 2002.

Silicon Genetics, "Similarity Metrics", http://www.silicongenetics.com/cgi/SiG.cgi/Products/GeneSpring/sim_metrics.smf?, p. 1, downloaded Jul. 15, 2002.

"GeneSpring", www.silicongenetics.com, pp. 1-2, downloaded Nov. 22, 2002.

Silicon Genetics, "Filtering Tools", http://www.silicongenetics.com/cgi/cgi/SiG.cgi/Products/GeneSpring/filter.smf?, p. 1, downloaded Jul. 15, 2002.

Silicon Genetics, "Tech Notes", http:www.silicongenetics.com/cgi/MasterPFP.cgi?doc=http://www.silicongenetics.com/c..., 5 pages, downloaded Nov. 22, 2002.

NCBI LocusLink, http://www.ncbi.nlm.nih.gov/LocusLink/, downloaded Apr. 3, 2003.

NCBI Entrez Genome, http://www.ncbi.nih.gov/mapview/map_search.cgi?taxid=9606, pp. 1-2, downloaded Apr. 3, 2004.

NCBI Entrez Genome, "Homo sapiens genome data and search tips", http://www.ncbi.nlm.nih.gov/cgi-bin/Entrez/static/humansearch.html, pp. 1-30, downloaded Nov. 22, 2002.

Silicon Genetics, "Analysis, Clustering and Predictive Tools", http://www.silicongenetics.com/cgi/SiG.cgi/Products/GeneSpring/tools.smf, p. 1, downloaded Jul. 15, 2002.

Silicon Genetics, "Predictive Tools (Machine Learning Algorithms)", http://www.silicongenetics.com/cgi/SiG.cgi/Products/GeneSpring/predict.smf?, p. 1, downloaded Jul. 15, 2002.

Householder, et al., "MATRIX", Second Edition.

Johnson et al., "Continuous Univariate Distributions," vol. 1, 2nd., John Wiley & Sonces, Inc., (Title and Table of Contents). NewYork, 1994.

Huber., "Robust Statistics," John Wiley & Sonces, Inc., (Title and Table of Contents). NewYork, 1981.

Bittner et al. Molecular classification of cutaneous malignant melanoma by gene expression profiling.( pp. 536-540), Nature vol. 406 Aug. 3, 2000.

Donna K Slonim. From patterns to pathways: gene expression data analysis comes of age. (pp. 502-508), Nature genetics supplement. vol. 32.Dec. 2002.

Luo et al. Human Prostate Cancer and Benign Prostatic Hyperplasia: Molecular Dissection by Gene Expression Profiling. (pp. 4683-4688), Cancer research 61, Jun. 15, 2001.

Tseng et al. Issues in cDNA microarray analysis: quality filtering, channel normalization, models of variations and assessment of gene effects. (pp. 2549-2557), Nucleic Acids Research, 2001,vol. 29, No. 12.

Minor, James M. et al., "Analysis of Clinical Data Using Neural Nets", J. Biopharmaceutical Statistics, 6(1), 83-104 1996.

Hobbs et al., "FASTUS: A Cascaded Finite-State Transducer for Extracting Information form Natural-Language Text", http://www.ai.sri.com/natural-language/projects/fastus.html, 1993.

Marquardt, "An Algorithm for Least-Squares Estimation of Nonlinear Parameters", J. Soc Indust Appl Math vol. II, No. 2, USA pp. 431-441,Jun. 1963.

Diamantaras et al., Principal Component Neural Networks, Theory and Applications John Wiley & Sons, Inc., pp. 146-157. 1996.

Manning & Schutze, Foundations of Statistical Natural Language Processing, MIT Press, 1st ed., 1999, pp. xxix-xxxiii.

Minor et al., "Use of Neural Networks to Analyze Drug Combination Interactions", submitted to COMCON 4, 4th International Conference on Advances in Communication & Control Proceedings, pp. 504-515, 1993.

Minor et al., "Neural Net Methods for Mapping Thermodynamic and Physical Properties in Environmental Problems", Abstract submitted to 1996 AIChE Spring National Meeting, New Orleans, LA, Feb. 25-29, 1996.

Minor et al., "Competetive Advantage via Advanced Technology: Neural Networks and Quality Control", Abstract and Article submitted to 1995 Quality Control Conference, Santa Clara, CA, Apr. 4-7, 1995.

http://www.mcclurenet.com/EMEA_PDFs/Q2a.pdf, European Agency for the Evaluation of Medicinal Products, Human Medicines Evaluation Unit, "Validation of Analytical Procedures: Methodology", Step 4, Consensus Guideline, Nov. 6, 1996.

http://www.qualityamerica.com/knowledgecente/articles/COE_lllCb.html, "Statisticaly Inference, Part 2, Tolerance Intervals", downloaded Apr. 16, 2003.

http://www.sop.inria.fr/robotvis/personnel/zzhang/Publis/Tutorial-Estem/node24.htm, "M-estimators",downloaded Apr. 16, 2003.

http://mathworld.wolfram.com/ConjugateGradientMethod.html.

http://www2.chass.ncsu.edu/garson/pa765/anova.htm, ANOVA.

www.gps.caltech.edu/ tapio/acm118/Handouts/ridge.pdf.

http://www.bioconductor.org.

http://linux.wku.edu/-lamonml/algor/sort/merge.html.

http://www.nist.gov/dads/HTML/quicksort.html.

"Agilent Synapsia Informatics Workbench", Agilent Technologies, Inc., Printed in the USA, Jul. 31, 2002.

"A Tribute to J. Bertin's Graphical Data Analysis", Antoine de FalguerollesLaboratoire de Statistique et Probabiliie's, UMR CNRS Universite' Paul Sabatier 118 route de Narbonne, Nov. 29, 1996.

Kandogan, E., "Star Coordinates: A Multi-dimensional Visualization Technique with Uniform Treatment of Dimensions" IBM Almaden Research Center, not dated.

Felsenstein, J., "SEQBOOT—Bootstrap, Jackknife, or Permutation Resampling of Molecular Sequence, Restriction Site, Gene Frequency or Character Data", © 1991-1993 by the University of Washington and Joseph Felsenstein.

Soga et al., Quantitative Metabolome Analysis Using Capillary Electrophoresis Mass Spectrometry. vol. 2, No. 5, pp. 488-494. Published on Web Jun. 28, 2003.

Liebler, Introduction to Proteomics, Humana Press, Totowa, NJ, pp. v, and Mar. 13, 2002.

http://www.itl.nist.gov/div898/handbook/pri/section4/pri473.htm, "Response surface model example", Section 5.4.7.3, downloaded Apr. 16, 2003.

http://www.itl.nist.gov/div898/handbook/pri/section3/pri336.htm, "Response surface designs", Section 5.3.3.6, downloaded Apr. 16, 2003.

Churchill., Using ANOVA to Analyze Microarry Data. pp. 173-175, and 177. vol. 37, No. 2, 2004.

* cited by examiner

FOCUS PLUS CONTEXT VIEWING AND MANIPULATION OF LARGE COLLECTIONS OF GRAPHS

CROSS-REFERENCE

This application is a continuation-in-part application of application Ser. No. 11/124,500, filed May 6, 2005, pending, which is a continuation-in-part application of application Ser. No. 10/964,524, filed Oct. 12, 2004, pending, which is a continuation-in-part of application Ser. No. 10/817,244, filed Apr. 3, 2004, to each of which we claim priority under 35 U.S.C. Section 120, which also claims the benefit of U.S. Provisional Application No. 60/460,479, now abandoned, and to which we also claim the benefit. application Ser. No. 11/124,500, application Ser. No. 10/964,524, application Ser. No. 10/817,244 and Provisional Application No. 60/460,479 are all hereby incorporated herein, in there entireties, by reference thereto.

BACKGROUND OF THE INVENTION

The advent of new experimental technologies that support molecular biology research have resulted in an explosion of data and a rapidly increasing diversity of biological measurement data types. Examples of such biological measurement types include gene expression from DNA microarray or Taqman experiments, protein identification from mass spectrometry or gel electrophoresis, cell localization information from flow cytometry, phenotype information from clinical data or knockout experiments, genotype information from association studies and DNA microarray experiments, Comparative Genomic Hybridizaton (CGH) data, array-based CGH data (aCGH) data, etc. This data is rapidly changing. New technologies frequently generate new types of data.

As array-based CGH technology develops, studies using this technology will include ever increasing numbers of arrays from which data is generated. There is a need to visualize such data in the context of a whole study to facilitate visual exploratory analysis of the data in context. Other fields may have the same or similar needs that may be met by a solution to visualize large data sets that may individually be represented in line graph form.

Current techniques for visualizing data typically do not scale well to large numbers of arrays, or do not visualize sufficient detail regarding an individual array when the technique is scalable to display data from a large number of arrays. For example, standard heat map-type visualizations may be employed to represent aCGH data, for example, see Pollack et al, "Microarray analysis reveals a major direct role of DNA copy number alteration in the transcriptional program of human breast tumors", PNAS, Oct. 1, 2002, vol. 99, no. 20, 12963-12968, which is incorporated herein, in its entirety, by reference thereto. While such representations are generally scalable to large numbers of arrays/experiments, it is difficult to explore the details underlying the heat maps. Other software products that share the same limitations include "dchip", see http://www.dchip.org, BioConductor, see http://www.bioconductor.org, and GeneSpring, see http://www.silicongenetics.com.

Visualization software and systems that are adapted specifically to CGH visualizations tend to show data superimposed on chromosome ideograms, see, for example, currently pending application Ser. No. 10/817,244 filed Apr. 3, 2004 and titled "Visualizing Expression Data on Chromosomal Graphic Schemes" and co-pending application Ser. No. 10/964,524 filed Oct. 12, 2004 and titled "Systems and Methods for Statistically Analyzing Apparent CGH Data Anomalies and Plotting Same", both of which are hereby incorporated herein, in their entireties, by reference thereto. While this is a natural context for CGH studies, such representations do not scale well for visualizing hundred of experiments simultaneously on a display, for example.

Visualization software and systems for displaying sparse data contained within very large datasets are described in co-pending application Ser. No. 10/918,897 filed Aug. 13, 2004 and titled "System and Methods for Navigating and Visualizing Multi-Dimensional Data", which is incorporated herein, in its entirety, by reference thereto.

There is a continuing need for methods, tools and systems that facilitate the visualization of larger collections of data, such as data that may be represented as groups of line graphs, in a compact graphical form, and for manipulating such visualizations for viewing and analysis by a user.

SUMMARY OF THE INVENTION

Methods, systems and computer readable media are provided for visualizing a collection of graphs, wherein each of the graphs may be aligned along one axis of a visualization. All graphs are aligned with respect to the one axis, and at least one metadata value per graph is aligned, in a first form of representation, with each graph. The visualization of the graphs are compressed in a direction along a second axis perpendicular to the first axis, and the metadata values are graphically represented in alignment with the compressed visualizations of the graphs.

Methods, systems and computer readable media are provided for visualizing and analyzing a collection of graphs, wherein each of the graphs may be aligned along one axis of a visualization. All graphs are aligned with respect to the one axis, and visualizations of the graphs are compressed in a direction along a second axis perpendicular to the first axis. The compressed visualizations are displayed and the graphs are monitored to identify when any graph matches a predetermined motif or exceeds a predetermined threshold. Each graph identified to match the predetermined motif or exceed the predetermined threshold is zoomed to display an open visualization of that graph to have a greater scale along the second axis than a scale of the compressed graphs.

A user interface is provided for visualizing and manipulating a collection of graphs and metadata, including a display configured to visualize the collection of graphs in compressed form and the associated metadata as graphical representations of a first format; and a feature for sorting a column of metadata, wherein the collection of graphs and all associated metadata are sorted in the same order resulting from the sorting a column of metadata.

These and other advantages and features of the invention will become apparent to those persons skilled in the art upon reading the details of the methods, systems and computer readable media as more fully described below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
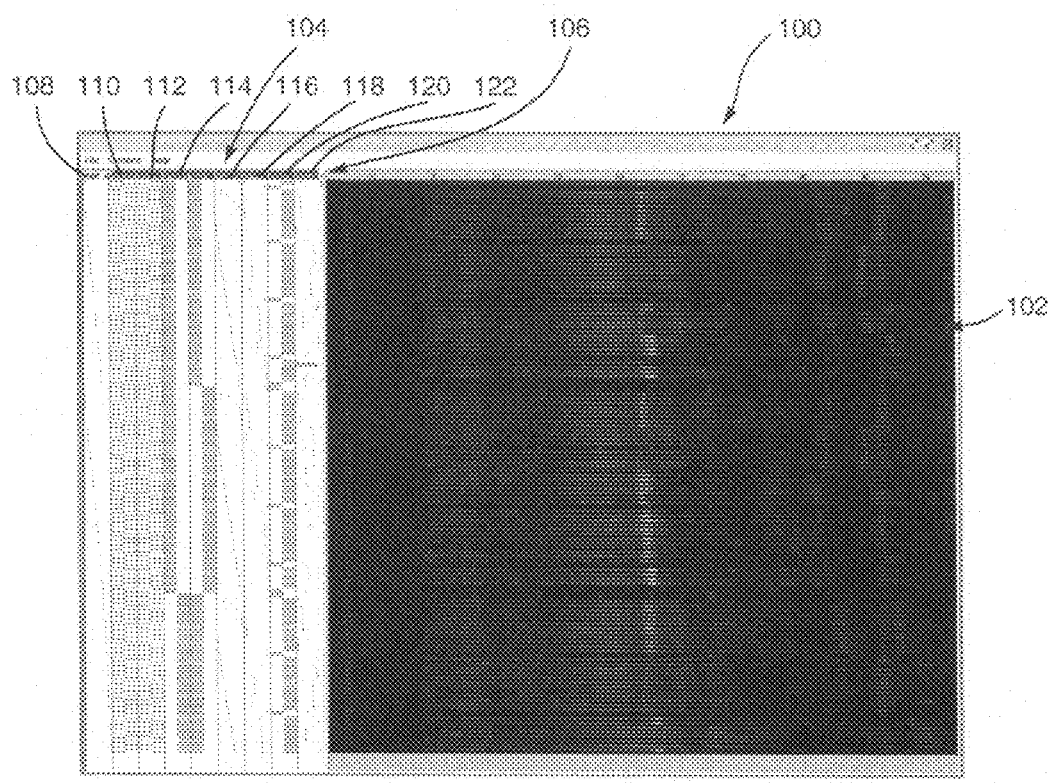
FIG. 1 shows an example of a collection of line graphs all in compressed visualizations on a user interface.

Before the present methods, tools, systems and computer readable media are described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "a graph" includes a plurality of such graphs and reference to "the array" includes reference to one or more arrays and equivalents thereof known to those skilled in the art, and so forth.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

DEFINITIONS

An "aberrant region" refers to an uninterrupted section of genetic data on a chromosome which has been identified to show significant amplification or deletion of genetic material.

"Color coding" refers to a software technique which maps a numerical or categorical value to a color value, for example representing high levels of gene expression or gene amplification as a reddish color and low levels of gene expression or a level of gene deletion as greenish colors, with varying shade/intensities of these colors representing varying degrees of expression or amplification. Genetic material which has been neither deleted nor amplified may have a value appearing as black, as being assigned no color intensity. Color-coding is not limited in application to expression levels or CGH data, but can be used to differentiate any data that can be quantified, so as to distinguish relatively high quantity values from relatively low quantity values. In any of these cases, a third color can be employed for relatively neutral or median values, and shading can be employed to provide a more continuous spectrum of the color indicators.

A "heat map" or "heat map visualization" is a visual representation of data wherein color-codings are used for displaying numerical values or ranges of numerical values. Numerical values or ranges of numerical values in a line graph may be encoded into colors representative of those numerical values or ranges, respectively. Color encodings may run on a continuum from one color through another, e.g. green to red or yellow to blue for numerical values.

The term "down-regulation" is used in the context of gene expression, and refers to a decrease in the amount of messenger RNA (mRNA) formed by expression of a gene, with respect to a control.

The term "gene" refers to a unit of hereditary information, which is a portion of DNA containing information required to determine a protein's amino acid sequence.

"Gene expression" refers to the level to which a gene is transcribed to form messenger RNA molecules, prior to protein synthesis.

"Gene expression ratio" is a relative measurement of gene expression, wherein the expression level of a test sample is compared to the expression level of a reference sample.

A "gene product" is a biological entity that can be formed from a gene, e.g. a messenger RNA or a protein.

"CGH data" refers to data obtained from "Comparative Genomic Hybridization" measurements. CGH involves a technique that measures DNA gains or losses. Some techniques perform this at the chromosomal level, while newer emerging techniques, such as "array-based CGH" (aCGH) use high throughput microarray measurements to measure the levels of specific DNA sequences in the genome. While not specifically limited to aCGH data, the present invention is applicable to aCGH data, which comes in a form analogous to array-based gene expression measurements.

The term "promote" refers to an increase of the effects of a biological agent or a biological process.

A "protein" is a large polymer having one or more sequences of amino acid subunits joined by peptide bonds.

The term "protein abundance" refers to a measure of the amount of protein in a sample; often done as a relative abundance measure vs. a reference sample.

"Protein/DNA interaction" refers to a biological process wherein a protein regulates the expression of a gene, commonly by binding to promoter or inhibitor regions.

"Protein/Protein interaction" refers to a biological process whereby two or more proteins bind together and form complexes.

A "sequence" refers to an ordered set of amino acids forming a protein or to an ordered set of nucleic acid bases forming a DNA fragment or an RNA molecule.

The term "overlay" or "data overlay" refers to a user interface technique for superimposing data from one view upon data in a different view; for example, overlaying gene expression ratios on top of a chromosome view.

A "spreadsheet" is an outsize ledger sheet simulated electronically by a computer software application; used frequently to represent tabular data structures.

The term "up-regulation", when used to describe gene expression, refers to an increase in the amount of messenger RNA (mRNA) formed by expression of a gene, with respect to a control.

The term "view" refers to a graphical presentation of a single visual perspective on a data set.

The term "visualization" or "information visualization" refers to an approach to data analysis that employs a variety of techniques which utilize human perception; techniques which may include graphical presentation of large amounts of data and facilities for interactively manipulating and exploring the data.

The term "metadata" is sometimes called "data about data". As used herein, "metadata" refers to data that is descriptive of or somehow characterizes the line graph that is on the same line of the display in which that metadata is displayed. That is, the metadata are attributes associated with the graph that can be used to classify or order a set of graphs, based upon comparisons of the associated metadata in ways that are meaningful to a user. Metadata may include classification names, experiment names, state of graph display, statistical values, or other alphanumeric or graphical entries that characterize the graph that the metadata is associated with.

The term "motif" refers to a specific recurring pattern. As used herein, a motif describes a specific line graph segment that represents a pattern of interest and which may be represented in more than one graph. Such a segment may have a characteristic shape that represents a specific fluctuation in a graft for which it is sought to identify similar fluctuations in other graphs. Searching for such motif may be performed at the same respective x-axis locations along the other graphs, or may be performed generally over the other graphs. Alternatively, a motif may be predetermined and used to search all graphs for its presence, wither along a specific x-axis location, or generally over all x-axis positions of the graphs.

The term "oligomer" is used herein to indicate a chemical entity that contains a plurality of monomers. As used herein, the terms "oligomer" and "polymer" are used interchangeably. Examples of oligomers and polymers include polydeoxyribonucleotides (DNA), polyribonucleotides (RNA), other nucleic acids that are C-glycosides of a purine or pyrimidine base, polypeptides (proteins) or polysaccharides (starches, or polysugars), as well as other chemical entities that contain repeating units of like chemical structure.

The term "nucleic acid" as used herein means a polymer composed of nucleotides, e.g., deoxyribonucleotides or ribonucleotides, or compounds produced synthetically (e.g., PNA as described in U.S. Pat. No. 5,948,902 and the references cited therein) which can hybridize with naturally occurring nucleic acids in a sequence specific manner analogous to that of two naturally occurring nucleic acids, e.g., can participate in Watson-Crick base pairing interactions.

The terms "ribonucleic acid" and "RNA" as used herein mean a polymer composed of ribonucleotides.

The terms "deoxyribonucleic acid" and "DNA" as used herein mean a polymer composed of deoxyribonucleotides.

The term "oligonucleotide" as used herein denotes single stranded nucleotide multimers of from about 10 to 100 nucleotides and up to 200 nucleotides in length.

The term "functionalization" as used herein relates to modification of a solid substrate to provide a plurality of functional groups on the substrate surface. By a "functionalized surface" is meant a substrate surface that has been modified so that a plurality of functional groups are present thereon.

The terms "reactive site", "reactive functional group" or "reactive group" refer to moieties on a monomer, polymer or substrate surface that may be used as the starting point in a synthetic organic process. This is contrasted to "inert" hydrophilic groups that could also be present on a substrate surface, e.g., hydrophilic sites associated with polyethylene glycol, a polyamide or the like.

The term "sample" as used herein relates to a material or mixture of materials, typically, although not necessarily, in fluid form, containing one or more components of interest.

The terms "nucleoside" and "nucleotide" are intended to include those moieties that contain not only the known purine and pyrimidine bases, but also other heterocyclic bases that have been modified. Such modifications include methylated purines or pyrimidines, acylated purines or pyrimidines, alkylated riboses or other heterocycles. In addition, the terms "nucleoside" and "nucleotide" include those moieties that contain not only conventional ribose and deoxyribose sugars, but other sugars as well. Modified nucleosides or nucleotides also include modifications on the sugar moiety, e.g., wherein one or more of the hydroxyl groups are replaced with halogen atoms or aliphatic groups, or are functionalized as ethers, amines, or the like.

The phrase "oligonucleotide bound to a surface of a solid support" refers to an oligonucleotide or mimetic thereof, e.g., PNA, that is immobilized on a surface of a solid substrate in a feature or spot, where the substrate can have a variety of configurations, e.g., a sheet, bead, or other structure. In certain embodiments, the collections of features of oligonucleotides employed herein are present on a surface of the same planar support, e.g., in the form of an array.

The term "array" encompasses the term "microarray" and refers to an ordered array presented for binding to nucleic acids and the like. Arrays, as described in greater detail below, are generally made up of a plurality of distinct or different features. The term "feature" is used interchangeably herein with the terms: "features," "feature elements," "spots," "addressable regions," "regions of different moieties," "surface or substrate immobilized elements" and "array elements," where each feature is made up of oligonucleotides bound to a surface of a solid support, also referred to as substrate immobilized nucleic acids.

An "array," includes any one-dimensional, two-dimensional or substantially two-dimensional (as well as a three-dimensional) arrangement of addressable regions (i.e., features, e.g., in the form of spots) bearing nucleic acids, particularly oligonucleotides or synthetic mimetics thereof (i.e., the oligonucleotides defined above), and the like. Where the arrays are arrays of nucleic acids, the nucleic acids may be adsorbed, physisorbed, chemisorbed, or covalently attached to the arrays at any point or points along the nucleic acid chain.

Any given substrate may carry one, two, four or more arrays disposed on a front surface of the substrate. Depending upon the use, any or all of the arrays may be the same or different from one another and each may contain multiple spots or features. A typical array may contain one or more, including more than two, more than ten, more than one hundred, more than one thousand, more ten thousand features, or even more than one hundred thousand features, in an area of less than 20 cm$^2$ or even less than 10 cm$^2$, e.g., less than about 5 cm$^2$, including less than about 1 cm$^2$, less than about 1 mm$^2$, e.g., 100 μ$^2$, or even smaller. For example, features may have widths (that is, diameter, for a round spot) in the range from a 10 μm to 1.0 cm. In other embodiments each feature may have a width in the range of 1.0 μm to 1.0 mm, usually 5.0 μm to 500 μm, and more usually 10 μm to 200 μm. Non-round features may have area ranges equivalent to that of circular features with the foregoing width (diameter) ranges. At least some, or all, of the features are of different compositions (for example, when any repeats of each feature composition are excluded the remaining features may account for at least 5%, 10%, 20%, 50%, 95%, 99% or 100% of the total number of features). Inter-feature areas will typically (but not essentially) be present which do not carry any nucleic acids (or other biopolymer or chemical moiety of a type of which the features are composed). Such inter-feature areas typically will be present where the arrays are formed by processes involving drop deposition of reagents but may not be present when, for example, photolithographic array fabrication processes are used. It will be appreciated though, that the inter-feature areas, when present, could be of various sizes and configurations.

Each array may cover an area of less than 200 cm$^2$, or even less than 50 cm$^2$, 5 cm$^2$, 1 cm$^2$, 0.5 cm$^2$, or 0.1 cm$^2$. In certain embodiments, the substrate carrying the one or more arrays will be shaped generally as a rectangular solid (although other shapes are possible), having a length of more than 4 mm and less than 150 mm, usually more than 4 mm and less than 80 mm, more usually less than 20 mm; a width of more than 4 mm and less than 150 mm, usually less than 80 mm and more usually less than 20 mm; and a thickness of more than 0.01 mm and less than 5.0 mm, usually more than 0.1 mm and less than 2 mm and more usually more than 0.2 and less than 1.5 mm, such as more than about 0.8 mm and less than about 1.2 mm. With arrays that are read by detecting fluorescence, the substrate may be of a material that emits low fluorescence upon illumination with the excitation light. Additionally in this situation, the substrate may be relatively transparent to reduce the absorption of the incident illuminating laser light and subsequent heating if the focused laser beam travels too slowly over a region. For example, the substrate may transmit at least 20%, or 50% (or even at least 70%, 90%, or 95%), of the illuminating light incident on the front as may be measured across the entire integrated spectrum of such illuminating light or alternatively at 532 nm or 633 nm.

Arrays can be fabricated using drop deposition from pulse-jets of either nucleic acid precursor units (such as monomers) in the case of in situ fabrication, or the previously obtained nucleic acid. Such methods are described in detail in, for example, the previously cited references including U.S. Pat. Nos. 6,242,266, 6,232,072, 6,180,351, 6,171,797, 6,323,043, U.S. patent application Ser. No. 09/302,898 filed Apr. 30, 1999 by Caren et al., and the references cited therein. As already mentioned, these references are incorporated herein by reference. Other drop deposition methods can be used for fabrication, as previously described herein. Also, instead of drop deposition methods, photolithographic array fabrication methods may be used. Inter-feature areas need not be present particularly when the arrays are made by photolithographic methods as described in those patents.

In certain embodiments of particular interest, in situ prepared arrays are employed. In situ prepared oligonucleotide arrays, e.g., nucleic acid arrays, may be characterized by having surface properties of the substrate that differ significantly between the feature and inter-feature areas. Specifically, such arrays may have high surface energy, hydrophilic features and hydrophobic, low surface energy hydrophobic interfeature regions. Whether a given region, e.g., feature or interfeature region, of a substrate has a high or low surface energy can be readily determined by determining the regions "contact angle" with water, as known in the art and further described in co-pending application Ser. No. 10/449,838, the disclosure of which is herein incorporated by reference. Other features of in situ prepared arrays that make such array formats of particular interest in certain embodiments of the present invention include, but are not limited to: feature density, oligonucleotide density within each feature, feature uniformity, low intra-feature background, low inter-feature background, e.g., due to hydrophobic interfeature regions, fidelity of oligonucleotide elements making up the individual features, array/feature reproducibility, and the like. The above benefits of in situ produced arrays assist in maintaining adequate sensitivity while operating under stringency conditions required to accommodate highly complex samples.

An array is "addressable" when it has multiple regions of different moieties, i.e., features (e.g., each made up of different oligonucleotide sequences) such that a region (i.e., a "feature" or "spot" of the array) at a particular predetermined location (i.e., an "address") on the array will detect a particular solution phase nucleic acid sequence. Array features are typically, but need not be, separated by intervening spaces.

Any given substrate may carry one, two, four or more arrays disposed on a front surface of the substrate and depending on the use of the array, any or all of the arrays may be the same or different from one another and each may contain multiple spots or features. The one or more arrays usually cover only a portion of the surface, with regions of the surface adjacent the opposed sides and leading end and trailing end of the surface not being covered by any array. Each array can be designed for testing against any type of sample, whether a trial sample, reference sample, a combination of them, or a known mixture of biopolymers such as polynucleotides. The substrate may be of any shape, as mentioned above.

As mentioned above, an array contains multiple spots or features of oligomers, e.g., in the form of polynucleotides, and specifically oligonucleotides. As mentioned above, all of the features may be different, or some or all could be the same. The interfeature areas may be of various sizes and configurations. Each feature carries a predetermined oligomer such as a predetermined polynucleotide (which includes the possibility of mixtures of polynucleotides). It will be understood that there may be a linker molecule of any known types between the surface and the first nucleotide.

The substrate may carry an identification code, e.g., in the form of a bar code or the like printed on the substrate in the form of a label attached by adhesive or any convenient means. The identification code may contain information relating to the array(s) located on the substrate, where such information may include, but is not limited to, an identification of array(s), i.e., layout information relating to the array(s), etc.

In the case of an array in the context of the present application, the "target" may be referenced as a moiety in a mobile phase (typically fluid), to be detected by "probes" which are bound to the substrate at the various regions.

A "scan region" refers to a contiguous (preferably, rectangular) area in which the array spots or features of interest, as defined above, are found or detected. Where fluorescent labels are employed, the scan region is that portion of the total area illuminated from which the resulting fluorescence is detected and recorded. Where other detection protocols are employed, the scan region is that portion of the total area queried from which resulting signal is detected and recorded. For the purposes of this invention and with respect to fluorescent detection embodiments, the scan region includes the entire area of the slide scanned in each pass of the lens, between the first feature of interest, and the last feature of interest, even if there exist intervening areas that lack features of interest.

An "array layout" refers to one or more characteristics of the features, such as feature positioning on the substrate, one or more feature dimensions, and an indication of a moiety at a given location. "Hybridizing" and "binding", with respect to nucleic acids, are used interchangeably.

By "remote location," it is meant a location other than the location at which the array is present and hybridization occurs. For example, a remote location could be another location (e.g., office, lab, etc.) in the same city, another location in a different city, another location in a different state, another location in a different country, etc. As such, when one item is indicated as being "remote" from another, what is meant is that the two items are at least in different rooms or different buildings, and may be at least one mile, ten miles, or at least one hundred miles apart. "Communicating" information references transmitting the data representing that information as electrical signals over a suitable communication channel (e.g., a private or public network). "Forwarding" an item refers to any means of getting that item from one location to the next, whether by physically transporting that item or otherwise (where that is possible) and includes, at least in the case of data, physically transporting a medium carrying the data or communicating the data. An array "package" may be the array plus only a substrate on which the array is deposited, although the package may include other features (such as a housing with a chamber). A "chamber" references an enclosed volume (although a chamber may be accessible through one or more ports). It will also be appreciated that throughout the present application, that words such as "top," "upper," and "lower" are used in a relative sense only.

The term "stringent assay conditions" as used herein refers to conditions that are compatible to produce binding pairs of nucleic acids, e.g., surface bound and solution phase nucleic acids, of sufficient complementarity to provide for the desired level of specificity in the assay while being less compatible to the formation of binding pairs between binding members of insufficient complementarity to provide for the desired specificity. Stringent assay conditions are the summation or combination (totality) of both hybridization and wash conditions.

A "stringent hybridization" and "stringent hybridization wash conditions" in the context of nucleic acid hybridization (e.g., as in array, Southern or Northern hybridizations) are sequence dependent, and are different under different experimental parameters. Stringent hybridization conditions that can be used to identify nucleic acids within the scope of the invention can include, e.g., hybridization in a buffer comprising 50% formamide, 5×SSC, and 1% SDS at 42° C., or hybridization in a buffer comprising 5×SSC and 1% SDS at 65° C., both with a wash of 0.2×SSC and 0.1% SDS at 65° C. Exemplary stringent hybridization conditions can also include a hybridization in a buffer of 40% formamide, 1 M NaCl, and 1% SDS at 37° C., and a wash in 1×SSC at 45° C. Alternatively, hybridization to filter-bound DNA in 0.5 M $NaHPO_4$, 7% sodium dodecyl sulfate (SDS), 1 mM EDTA at 65° C., and washing in 0.1×SSC/0.1% SDS at 68° C. can be employed. Yet additional stringent hybridization conditions include hybridization at 60° C. or higher and 3×SSC (450 mM sodium chloride/45 mM sodium citrate) or incubation at 42° C. in a solution containing 30% formamide, 1M NaCl, 0.5% sodium sarcosine, 50 mM MES, pH 6.5. Those of ordinary skill will readily recognize that alternative but comparable hybridization and wash conditions can be utilized to provide conditions of similar stringency.

In certain embodiments, the stringency of the wash conditions that set forth the conditions which determine whether a nucleic acid is specifically hybridized to a surface bound nucleic acid. Wash conditions used to identify nucleic acids may include, e.g.: a salt concentration of about 0.02 molar at pH 7 and a temperature of at least about 50° C. or about 55° C. to about 60° C.; or, a salt concentration of about 0.15 M NaCl at 72° C. for about 15 minutes; or, a salt concentration of about 0.2×SSC at a temperature of at least about 50° C. or about 55° C. to about 60° C. for about 15 to about 20 minutes; or, the hybridization complex is washed twice with a solution with a salt concentration of about 2×SSC containing 0.1% SDS at room temperature for 15 minutes and then washed twice by 0.1×SSC containing 0.1% SDS at 68° C. for 15 minutes; or, equivalent conditions. Stringent conditions for washing can also be, e.g., 0.2×SSC/0.1% SDS at 42° C.

A specific example of stringent assay conditions is rotating hybridization at 65° C. in a salt based hybridization buffer with a total monovalent cation concentration of 1.5 M (e.g., as described in U.S. patent application Ser. No. 09/655,482 filed on Sep. 5, 2000, the disclosure of which is herein incorporated by reference) followed by washes of 0.5×SSC and 0.1× SSC at room temperature.

Stringent assay conditions are hybridization conditions that are at least as stringent as the above representative conditions, where a given set of conditions are considered to be at least as stringent if substantially no additional binding complexes that lack sufficient complementarity to provide for the desired specificity are produced in the given set of conditions as compared to the above specific conditions, where by "substantially no more" is meant less than about 5-fold more, typically less than about 3-fold more. Other stringent hybridization conditions are known in the art and may also be employed, as appropriate.

A "CGH array" or "aCGH array" refers to an array that can be used to compare DNA samples for relative differences in copy number. In general, an aCGH array can be used in any assay in which it is desirable to scan a genome with a sample of nucleic acids. For example, an aCGH array can be used in location analysis as described in U.S. Pat. No. 6,410,243, the entirety of which is incorporated herein. In certain aspects, a CGH array provides probes for screening or scanning a genome of an organism and comprises probes from a plurality of regions of the genome. In one aspect, the array comprises probe sequences for scanning an entire chromosome arm, wherein probes targets are separated by at least about 500 bp, at least about 1 kb, at least about 5 kb, at least about 10 kb, at least about 25 kb, at least about 50 kb, at least about 100 kb, at least about 250 kb, at least about 500 kb and at least about 1 Mb. In another aspect, the array comprises probes sequences for scanning an entire chromosome, a set of chromosomes, or the complete complement of chromosomes forming the organism's genome. By "resolution" is meant the spacing on the genome between sequences found in the probes on the array. In some embodiments (e.g., using a large number of probes of high complexity) all sequences in the genome can be present in the array. The spacing between different locations of the genome that are represented in the probes may also vary, and may be uniform, such that the spacing is substantially the same between sampled regions, or non-uniform, as desired. An assay performed at low resolution on one array, e.g., comprising probe targets separated by larger distances, may be repeated at higher resolution on another array, e.g., comprising probe targets separated by smaller distances.

In certain aspects, in constructing the arrays, both coding and non-coding genomic regions are included as probes, whereby "coding region" refers to a region comprising one or more exons that is transcribed into an mRNA product and from there translated into a protein product, while by non-coding region is meant any sequences outside of the exon regions, where such regions may include regulatory sequences, e.g., promoters, enhancers, untranslated but transcribed regions, introns, origins of replication, telomeres, etc. In certain embodiments, one can have at least some of the probes directed to non-coding regions and others directed to coding regions. In certain embodiments, one can have all of the probes directed to non-coding sequences. In certain embodiments, one can have all of the probes directed to coding sequences. In certain other aspects, individual probes comprise sequences that do not normally occur together, e.g., to detect gene rearrangements, for example.

In some embodiments, at least 5% of the polynucleotide probes on the solid support hybridize to regulatory regions of a nucleotide sample of interest while other embodiments may have at least 30% of the polynucleotide probes on the solid support hybridize to exonic regions of a nucleotide sample of interest. In yet other embodiments, at least 50% of the polynucleotide probes on the solid support hybridize to intergenic (e.g., non-coding) regions of a nucleotide sample of interest. In certain aspects, probes on the array represent random selection of genomic sequences (e.g., both coding and non-coding). However, in other aspects, particular regions of the genome are selected for representation on the array, e.g., such as CpG islands, genes belonging to particular pathways of interest or whose expression and/or copy number are associated with particular physiological responses of interest (e.g., disease, such a cancer, drug resistance, toxological responses and the like). In certain aspects, where particular genes are identified as being of interest, intergenic regions proximal to those genes are included on the array along with, optionally, all or portions of the coding sequence corresponding to the genes. In one aspect, at least about 100 bp, 500 bp, 1,000 bp, 5,000 bp, 10,000 kb or even 100,000 kb of genomic DNA upstream of a transcriptional start site is represented on the array in discrete or overlapping sequence probes. In certain aspects, at least one probe sequence comprises a motif sequence to which a protein of interest (e.g., such as a transcription factor) is known or suspected to bind.

In certain aspects, repetitive sequences are excluded as probes on the arrays. However, in another aspect, repetitive sequences are included.

The choice of nucleic acids to use as probes may be influenced by prior knowledge of the association of a particular chromosome or chromosomal region with certain disease conditions. International Application WO 93/18186 provides a list of exemplary chromosomal abnormalities and associated diseases, which are described in the scientific literature. Alternatively, whole genome screening to identify new regions subject to frequent changes in copy number can be performed using the methods of the present invention discussed further below.

In some embodiments, previously identified regions from a particular chromosomal region of interest are used as probes. In certain embodiments, the array can include probes which "tile" a particular region (e.g., which have been identified in a previous assay or from a genetic analysis of linkage), by which is meant that the probes correspond to a region of interest as well as genomic sequences found at defined intervals on either side, i.e., 5' and 3' of, the region of interest, where the intervals may or may not be uniform, and may be tailored with respect to the particular region of interest and the assay objective. In other words, the tiling density may be tailored based on the particular region of interest and the assay objective. Such "tiled" arrays and assays employing the same are useful in a number of applications, including applications where one identifies a region of interest at a first resolution, and then uses tiled array tailored to the initially identified region to further assay the region at a higher resolution, e.g., in an iterative protocol.

In certain aspects, the array includes probes to sequences associated with diseases associated with chromosomal imbalances for prenatal testing. For example, in one aspect, the array comprises probes complementary to all or a portion of chromosome 21 (e.g., Down's syndrome), all or a portion of the X chromosome (e.g., to detect an X chromosome deficiency as in Turner's Syndrome) and/or all or a portion of the Y chromosome Klinefelter Syndrome (to detect duplication of an X chromosome and the presence of a Y chromosome), all or a portion of chromosome 7 (e.g., to detect William's Syndrome), all or a portion of chromosome 8 (e.g., to detect Langer-Giedon Syndrome), all or a portion of chromosome 15 (e.g., to detect Prader-Willi or Angelman's Syndrome, all or a portion of chromosome 22 (e.g., to detect Di George's syndrome).

Other "themed" arrays may be fabricated, for example, arrays including whose duplications or deletions are associated with specific types of cancer (e.g., breast cancer, prostate cancer and the like). The selection of such arrays may be based on patient information such as familial inheritance of particular genetic abnormalities. In certain aspects, an array for scanning an entire genome is first contacted with a sample and then a higher-resolution array is selected based on the results of such scanning.

Themed arrays also can be fabricated for use in gene expression assays, for example, to detect expression of genes involved in selected pathways of interest, or genes associated with particular diseases of interest.

In one embodiment, a plurality of probes on the array are selected to have a duplex $T_m$ within a predetermined range. For example, in one aspect, at least about 50% of the probes have a duplex $T_m$ within a temperature range of about 75° C. to about 85° C. In one embodiment, at least 80% of said polynucleotide probes have a duplex $T_m$ within a temperature range of about 75° C. to about 85° C., within a range of about 77° C. to about 83° C., within a range of from about 78° C. to about 82° C. or within a range from about 79° C. to about 82° C. In one aspect, at least about 50% of probes on an array have range of $T_m$'s of less than about 4° C., less then about 3° C., or even less than about 2° C., e.g., less than about 1.5° C., less than about 1.0° C. or about 0.5° C.

The probes on the microarray, in certain embodiments have a nucleotide length in the range of at least 30 nucleotides to 200 nucleotides, or in the range of at least about 30 to about 150 nucleotides. In other embodiments, at least about 50% of the polynucleotide probes on the solid support have the same nucleotide length, and that length may be about 60 nucleotides.

In certain aspects, longer polynucleotides may be used as probes. In addition to the oligonucleotide probes described above, cDNAs, or inserts from phage BACs (bacterial artificial chromosomes) or plasmid clones, can be arrayed. Probes may therefore also range from about 201-5000 bases in length, from about 5001-50,000 bases in length, or from about 50,001-200,000 bases in length, depending on the platform used. If other polynucleotide features are present on a subject array, they may be interspersed with, or in a separately-hybridizable part of the array from the subject oligonucleotides.

In still other aspects, probes on the array comprise at least coding sequences.

In one aspect, probes represent sequences from an organism such as *Drosophila melanogaster*, *Caenorhabditis elegans*, yeast, zebrafish, a mouse, a rat, a domestic animal, a companion animal, a primate, a human, etc. In certain aspects, probes representing sequences from different organisms are provided on a single substrate, e.g., on a plurality of different arrays.

A "CGH assay" using an aCGH array can be generally performed as follows. In one embodiment, a population of nucleic acids contacted with an aCGH array comprises at least two sets of nucleic acid populations, which can be derived from different sample sources. For example, in one aspect, a target population contacted with the array comprises a set of target molecules from a reference sample and from a test sample. In one aspect, the reference sample is from an organism having a known genotype and/or phenotype, while the test sample has an unknown genotype and/or phenotype or a genotype and/or phenotype that is known and is different from that of the reference sample. For example, in one aspect, the reference sample is from a healthy patient while the test sample is from a patient suspected of having cancer or known to have cancer.

In one embodiment, a target population being contacted to an array in a given assay comprises at least two sets of target populations that are differentially labeled (e.g., by spectrally distinguishable labels). In one aspect, control target molecules in a target population are also provided as two sets, e.g., a first set labeled with a first label and a second set labeled with a second label corresponding to first and second labels being used to label reference and test target molecules, respectively.

In one aspect, the control target molecules in a population are present at a level comparable to a haploid amount of a gene represented in the target population. In another aspect, the control target molecules are present at a level comparable to a diploid amount of a gene. In still another aspect, the control target molecules are present at a level that is different from a haploid or diploid amount of a gene represented in the target population. The relative proportions of complexes formed labeled with the first label vs. the second label can be used to evaluate relative copy numbers of targets found in the two samples.

In certain aspects, test and reference populations of nucleic acids may be applied separately to separate but identical arrays (e.g., having identical probe molecules) and the signals from each array can be compared to determine relative copy numbers of the nucleic acids in the test and reference populations.

Sensitivity is a term used to refer to the ability of a given assay to detect a given analyte in a sample, e.g., a nucleic acid species of interest. For example, an assay has high sensitivity if it can detect a small concentration of analyte molecules in sample. Conversely, a given assay has low sensitivity if it only detects a large concentration of analyte molecules (i.e., specific solution phase nucleic acids of interest) in sample. A given assay's sensitivity is dependent on a number of parameters, including specificity of the reagents employed (e.g., types of labels, types of binding molecules, etc.), assay conditions employed, detection protocols employed, and the like. In the context of array hybridization assays, such as those of the present invention, sensitivity of a given assay may be dependent upon one or more of: the nature of the surface immobilized nucleic acids, the nature of the hybridization and wash conditions, the nature of the labeling system, the nature of the detection system, etc.

Liquid chromatography is an analytical chromatographic technique that is useful for separating components, typically ions or molecules, that are dissolved in a solvent. In this technique, the components (e.g., analytes) are first dissolved in a solvent and then are forced to flow through a chromatographic column that can range from a few centimeters to several meters. The column is packed with a solid phase chromatographic material that is matched to the solvents in use and binds the analytes via adsorption. An additional, different solvent is then mixed into the flow in increasing concentrations (such as by a smooth gradient increases, or step-wise increases, for example). Each compound in the analyte releases from the solid phase at a specific concentration of the additional solvent and then flows off of the column resulting in a serial separation of the compounds contained in the analyte. A variety of detectors for identifying the presence of compounds in the effluent have been developed over the past thirty years based on a variety of different sensing principles. Typically, signal intensity from a chromatographic detector can be plotted as a function of elution time (a chromatogram) and peaks are used to identify the components. Other techniques, such as characteristic retention time in a chromatographic column, may also be applied to identify the components. A mass spectrometer in this application functions as a very sensitive, multiplexed detector that can detect the presence of multiple compounds simultaneously and can differentiate between the compounds detected.

Liquid chromatography/mass spectrometry (LC/MS) is a widely used technique for the global identification and quantitation of proteins, peptides and/or metabolites in complex biological samples. In this technique, liquid chromatography is used in-line with a mass spectrometer to chromatographically separate components prior to mass detection, in order to reduce the number of components presented to the mass spectrometer at a given time.

The present invention provides systems, tools, methods and computer readable media for visualizing very large collections (i.e., up to one hundred, one hundred to one thousand, or even thousands) of line graphs, scatter plots or any other data that can be converted into line graph representations, in a compact, graphical form, while still maintaining the ability to examine a single, or several such line graphs in detail, in the context of the very large collection of graphs, and also providing facilities to manipulate the collection of line graph representations to facilitate analysis and comparison among the graphs. Associated metadata entries in the visualization are linked to the line graph data and are useful in performing manipulations of the line graph visualizations. The ability to visualize a single, or several line graphs in detail, in the context of the very large collection of graphs provided as a compressed visualization, is sometimes referred to as focus plus context. For example, when compressing scatter plots, the points in the scatter plots may be connected by gradient lines each connecting two points. These could be linear gradients or gradients that represent a spline fit or any other interpolation scheme. If multiple points of a plot exist on the same X-axis location, then those values may be averaged or otherwise combined into one representative data value per X-axis location, because in the most collapsed or compressed view, each X-coordinate location point can only be represented by one Y-Coordinate value. Also, when fully compressed, the view is essentially a heat map view, where Y-coordinate values may be represented by color-coding. Examples of data that may be displayed and manipulated according to the present invention include, but are not limited to: collections of aCGH data provided from experiments carried out on arrays (e.g., hundreds up to thousands of such experiments may be displayed on a single display, such as a computer monitor display); or collections of related spectra such as a collection of ultraviolet spectra, a collection of visual light spectra, a collection of infrared spectra, a collection of nuclear magnetic resonance spectra, a collection of mass spectrographs, or any other collection of related spectra, or any other data that can be represented in line graph form, such as a collection of EKG or EEG graphs, telephone call logs, etc. Exploration in detail of data within displays of such collections is also possible.

Referring now to FIG. 1, an example of a collection of line graphs 102 is shown in fully compressed form on user interface 100. The "compressed form" or "compressed view" of a graph is a different rendering of the two-dimensional line graph, in which the graph is rendered or represented along only one dimension (i.e., along the X-axis), e.g., in a one-dimensional "ribbon" rendering, where the y-coordinate value is represented along each corresponding x-coordinate value by a color intensity. This allows the two-dimensional line graph to be rendered in a smaller space (ultimately, as small as one pixel in the Y-direction, if needed for display of very large numbers of graphs). However, the compressed view loses detail since the human eye can only distinguish a limited number of color shades. It is also more difficult to analytically compare shades of different graphs then it is to compare spatial differences in the y-value positions of the corresponding two-dimensional renderings of the graphs. Accordingly, when more detail is needed for further analysis, a user can open up a compressed view of a graph into the open form (two-dimensional, decompressed rendering), as described in more detail below. Thus, the closed or compressed view and the open or decompressed view are one- and two-dimensional representations of the exact same data, with the open view generally taking more space then the closed view.

The data displayed in FIG. 1 is from experiments run on an Agilent Lab-on-a-Chip System (ALP 5100, Agilent Technologies, Inc., Palo Alto, Calif.). The line graphs 102 are graphs from two hundred fifty-five electropherograms measured on different strains of wheat. Some measurements were for actual wheat strains and some were calibration and wash runs performed to provide analytical value for calibration and quality control. The line graphs 102 are shown in scale so that it can be understood that hundreds or even thousands of such experiments could be displayed on a standard computer display in a single visualization. Further, if additional experiments exist (i.e., greater than a maximum number that can be displayed at one time on the user interface 100), the user interface 100 is equipped to scroll through the display to visualize the additional experiments.

The X-axis for the line graphs 102 displays the migration time, in seconds, of the component being measured. The Y-axis for the line graphs 102 displays the intensity of the electropherogram signal. Because the graphs 102 are compressed in the direction of the Y-axis in FIG. 1, the Y-values for the graphs are represented by color-coding, that is a color-gradient mapping of Y-values is displayed wherein, for example, values less than may be color-coded by a first color, with gradations of that color or hues of that color, and/or intensity changing as the values range further and further from zero. In the example shown, some data may possibly be shown as negative due to normalization calculations performed by the ALP software. However, negative values are typically not expected for this type of data measurement. Y-values greater than zero may be color-coded by a second color, with changes in hues and/or intensities being provided correspondingly to values that range further and further above the zero value. Additionally, values equal to zero may be color-coded by a third color. In this example, since values below zero, if any, will typically not be of analytical interest to a user, only a single color is used to show gradient/intensity changes for values above zero (i.e., the color blue in FIG. 1), with the gradients intensities darkening to black for values of zero.

To make the most compact possible rendering of the data, each line segment of each line graph was color-coded (e.g., in the same or similar way that heat map coloring is done in typical gene expression heat maps). For an example of typical heat map color coding, see Kincaid, "VistaClara: an interactive visualization for exploratory analysis of DNA microarrays", Proceedings of the 2004 ACM symposium on Applied computing, ACM Press, 2004, pp 167-174, and co-pending application Ser. No. 10/403,762 filed Mar. 31, 2003 and titled "Methods and System for Simultaneous Visualization and Manipulation of Multiple Data Types", both of which are hereby incorporated herein, in their entireties, by reference thereto. Color-coding allows the graphic representation of the line graphs in compressed form, such that regions of interest, such as deletions and amplifications (and/or significant increases and decreases in expression levels or other graph values) may still be noticed by the color representations thereof, albeit in lower resolution. However, such a compressed view may be very powerful for visual identification of trends among multiple experiments.

Additionally shown in FIG. 1, user interface displays a table 104 of linked metadata along side of the line graphs 102, wherein each row of metadata is linked to the row (line graph) adjacent it, such that the metadata table 104 and line graphs 102 form a matrix of data. Accordingly, when any column of the metadata is rearranged/reordered, all other columns of the metadata are rearranged/reordered in the same manner, as are the line graphs 102, since all are linked as members of the same row of a matrix, respectively, and sort operations are carried out on a row basis of the matrix. This metadata in metadata table 104 may include categorical data such as names, labels, alphanumeric ID's etc, or continuous numerical data such as a single experimental measurement for the entire sample being depicted in the corresponding line graph (temperature, concentration, amount of drug, etc.).

The view of the metadata table may be widened or narrowed by selecting button 132 or 134, respectively, or by clicking on the right border of the table view 104 and dragging it either leftwardly or rightwardly.

Figure 2:
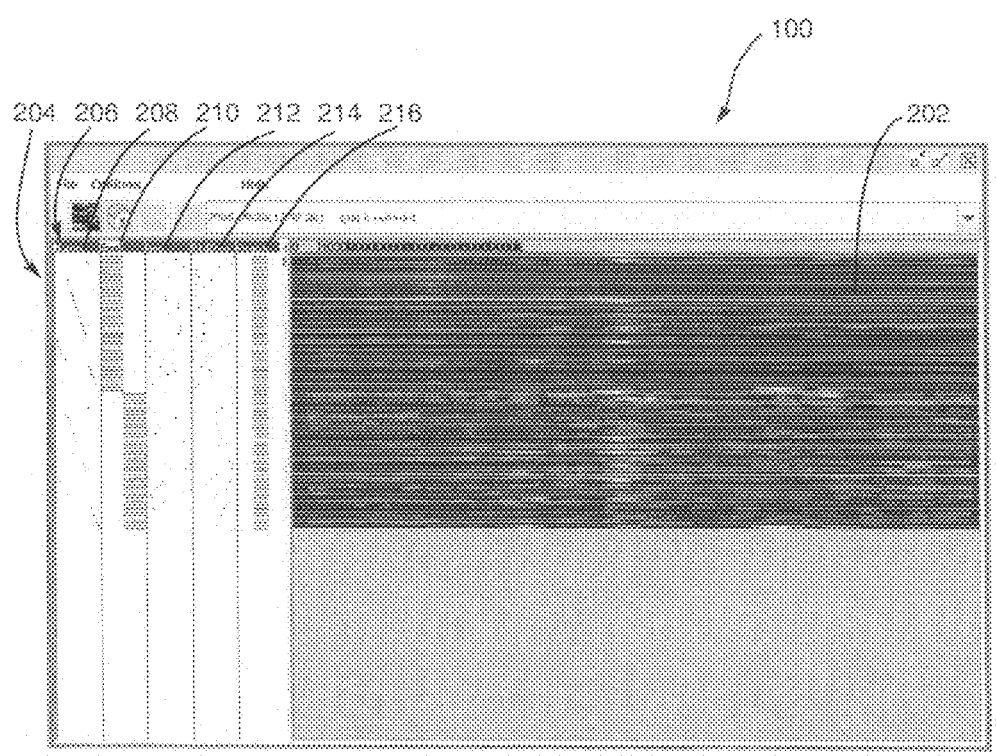
FIG. 2 shows another example of a collection of line graphs all in compressed visualization on a user interface.

The header cells 106 along the X-axis at the top of the metadata table 104 include the names of the different types of metadata contained in each column, and the underlying cells display the values for that named type of metadata, for each line graph that lies adjacent it, respectively. The metadata in the cells in each column of the metadata table 104 may be alphanumeric entries, or may be graphically rendered to graphically represent predetermined values or values relative to a preset range. For example, the metadata in column 108 (WSR ID) contains wheat strain identification numbers. "Channel ID" column 110 contains values referencing which of two channels of the ALP system was used to record the line graph data for the row in which the value appears. The ALP system has two ultraviolet detector channels, and therefore the values of the Channel ID column 110 are represented as either "1" or "2" in the open view. In the closed or compressed view, the value 1 is graphically represented as a horizontal line on the left hand side of the cell in which it is positioned, and the value 2 is graphically represented as a horizontal line on the right hand side of its respective cell. "Role ID" column 112 contains identifiers indicating the purpose for each measurement/line graph. Role ID identifies whether the measurement is an internal standard or a sample measurement. In this example, the values for Role ID were either 8192, referring to an internal standard, or 20481, referring to a sample measurement, both as displayed in the open view. In the closed or compressed view, 8192 is graphically represented as a horizontal line on the left hand side of the cell in which it is positioned, and 20481 is graphically represented as a horizontal line on the right hand side of its respective cell. "Plate ID" column 114 contains identifiers as to which plate a sample being measured originated from. The ALP system may contain a plurality of microwell plates, and this metadata column simply tracks which microwell plate the sample measured on a particular row of the display originated from. In the example shown, the Plate ID values are integers when in the open view, and horizontal lines geometrically placed in different locations along the respective cell spaces to graphically/spatially differentiate the integer values in the closed or compressed view. "SIP Order ID" column 116 contains values indicating the order in which samples were processed from a particular well. The ALP system sucks up a tiny amount of sample from a microwell to process a sample, using what is referred to as a "sipper". Accordingly, sip order is the relative order in which the processed samples were sipped from that microwell. SIP Order ID values may be displayed as integers ranging from one up to the total number of sips performed from a microwell, in the open view, and as horizontal lines geometrically placed in different locations along the respective cell spaces to graphically/spatially differentiate the integer values, in the compressed view. "Well Coordinate" column 118 contains values identifying the specific well on a plate that the sample was taken from. Well coordinates are typically unique identifiers (alphanumeric identifiers, in this example) that identify the specific well locations, and are displayed as alphanumeric identifiers in the open view in the example of FIG. 1. In a compressed view, the well coordinates are displayed as horizontal lines geometrically placed in different locations along the respective cell spaces to graphically/spatially differentiate the different identifiers, with rows having the same identifiers being placed in the same geographic location, relative to the width of each respective cell. Category" column 120 contains textual identifiers as to whether the adjacent graph was generated from an actual sample (i.e., an actual wheat strain sample in this example, labeled "SAMPLE"), or was a calibration run (e.g., "LADDER"). "Ladders" are separate calibration runs with standards having known run times that can be used to recalibrate the system and to align the samples between the ladder runs. In the open view, the category names may be textually (alphanumerically) represented, while in the compressed view, the category names are represented by horizontal lines geometrically placed in different locations along the respective cell spaces to graphically/spatially differentiate the different category names. Turning now to FIG. 2, another display of compressed data is shown on user interface 100. The compressed line graphs 202 were generated from data from a breast cancer study conducted by Pollack et al. and reported in "Microarray analysis reveals a major direct role of DNA copy number alteration in the transcriptional program of human breast tumors", which was incorporated by reference above. In the view shown, data from a collection of eighty-two microarray experiments is displayed in compressed form. Data for eighty-two microarrays (some gene expression and some aCGH) were loaded into the system and a simple moving average was computed for every contiguous group of twenty measurements for a single array. Contiguous measurements are those measurements taken from contiguous locations along a chromosome, and the data from the same is displayed in the same order, relative to chromosome position. The X-axis for the line graphs 202 displays relative positions along chromosome 17 that the measurements correspond to. The Y-axis for the line graphs 202 displays the moving average value for gene expression, or for copy number, depending upon whether the line graph is generated from a gene expression experiment/microarray or a CGH experiment/array, respectively.

A color-gradient mapping of log ratio values (between cancer and non-cancer samples) is displayed wherein, for example, log ratios less than a value of zero may be color-coded by a first color and log ratio values greater than zero may be color-coded by a second color. Additionally, log ratio values equal to zero appear black, as encoded by zero color intensity. For example, a continuous, nonlinear, sigmoidal color grading schema may be employed where low log ratios much less than zero are assigned a bright green color, with the green color continuously darkening as values approach one, with values of one assigned no color intensity (and this appearing as black), and with values greater than one being assigned a red color, dark red for values only slightly greater than one and increasingly and continuously brightening as the values increase. For example, a continuous, nonlinear, sigmoidal color grading schema may be employed where high values much greater than zero are assigned a bright yellow color, with the yellow color continuously darkening as values approach zero, with values of zero assigned no color intensity (black), and with values less than zero being assigned a blue color, dark blue for values only slightly less than zero and increasingly and continuously brightening as the values decrease. Of course, the particular color assignments are arbitrary, and may be switched, or replaced by other colors, with the same logic applying to increases in intensity, and where the two colors chosen are typically easily distinguishable from one another.

For CGH values that are plotted, the user may interpret high ratios as possible amplifications and low ratios as possible deletions. Alternatively, Z-scores or other statistical aberrations scores may be plotted with regard to the CGH data and then plotted as described herein. An example of such Z-score plotting is described in application Ser. No. 10/964,524 and then plotted as described herein.

To make the most compact possible rendering of the data, each line segment of each line graph representing the microarrays was color-coded (e.g., in the same or similar way that heat map coloring is done in typical gene expression heat maps). Color-coding allows the graphic representation of the line graphs in compressed form, such that regions of interest, such as deletions and amplifications (and/or significant increases and decreases in expression levels) may still be noticed by the color representations thereof, albeit in much less detail. However, such a compressed view may be very powerful for visual identification of trends among multiple experiments.

The header cells 206 along the X-axis at the top of the metadata table 204 include the names of the different types of metadata contained in each column, which, in this example, includes name ("Name" 208), experiment ("Expt" 210), average value ("Avg" 212), standard deviation (StdDev) 214), and graph ("Graph" 216). The metadata in the cells in the Name 208 column include textual names associated with the samples (i.e., cell lines). The Expt 210 column includes an indication of whether the line graph rendered was generated from a gene expression experiment (i.e., indicated as "mRNA") or a CGH experiment (i.e., indicated as "DNA"). The Avg column 212 contains an average value over the values plotted for the line graph in the same row. The average values may be pre-calculated prior to uploading data to the system, or the system may calculate the average values from the values plotted in the line graphs and populate column 212 with the calculated values. StdDev 214 contains a column of standard deviation values calculated for the values in each line graph, respectively. Like the Avg values, the StdDev values may be pre-calculated or calculated by the system. The Graph column 216 contains a graphical indicator, for each line graph, indicating whether the line graph is compressed or not compressed, as described in further detail below. Additional columns of metadata values that may be included in the metadata table, include, but are not limited to maximum (Max) value of each graph, minimum (Min) value of each graph, as well as other statistical values calculated with respect to each graph.

Note that, no matter what the form of the metadata in a column is (textual, alphanumeric, numeric, graphic, etc.), when the row in which the metadata value appears is compressed, the metadata is represented graphically in the compressed view. Different schemes for the compression of the metadata are provided, depending upon what the metadata is describing, so that the compressed view also facilitates analysis by a user. For example, in FIG. 2, the Expt metadata column, the metadata entry in this column for a line graph rendered from a CGH experiment (DNA) appears as a line on the left hand side of the Expt column 208 when compressed, while an entry on a row in which a line graph rendered from a gene expression experiment (mRNA) is located, appears as a line on the right hand side of the Expt column 208. Accordingly, a user can readily identify the type of experiment for each line entry even when the data is compressed, simply by noting the relative positions of the lines in column 208. Thus, compressed visualizations of metadata provide potential analytical value to a user. In the example shown in FIG. 2, it is readily recognizable that all of the CGH experiments are grouped at the top of the visualization, while the gene expression experiments are grouped at the bottom. When any line is uncompressed, the metadata for that line, as well as the line graph are shown in detail, so that "DNA" or "mRNA" would then replace the line that was previously displayed in the compressed view. The sorting features of metadata table 104 allows the user to manipulate the ordering of the line graphs 102,202 to place related graphs in proximity to one another for visual comparison and pattern finding.

For the Avg and StdDev columns, a range of averages and standard deviation values are computed by the system, and the value for each cell is then placed graphically as a point or dot in the column as it would appear on the calculated range, assuming the calculated range spans the width of the column in which the dot is plotted. For example, if average values for all line graphs plotted range from 0.5 to 2.0 and the average value of a particular line graph was calculated to be 1.0, then the point plotted in the Avg metadata column 212 for the row on which that line graph appeared would be plotted ⅓ of the distance from the left end of the cell. By graphically positioning the average and standard deviation values in this manner, a user can look for similarities and trends in this data even when in the compressed view. Thus, numerical metadata values are essentially "plotted" along the horizontal direction (x-axis) of the corresponding cells in the metadata column for those values, when in the compressed view. Accordingly, a user viewing a column of such metadata in a compressed view can make numerical comparisons of the numerical values in that metadata column, based on the relative placements of the compressed graphical representations of the numerical values (e.g., graphs with a high standard deviation value will show a graphical indicator more to the right side of the cell than graphs having a relatively lower standard deviation, which will be indicated more toward the left side of the respective cell). Categorical metadata such as names, tags, categories, etc. are simply assigned a valued and plotted similarly to the numerical data. In this way, by noting the position of a plotted attribute, a user can identify, in the compressed view, which graphs have the same attribute, and which ones are different. When sorting by a particular attribute, like attribute values align and provide feedback to the user as a visual indicator that that column of metadata has been sorted. Sorting by one column of metadata may also result in an arrangement from which it can be observed that there is a strong correlation between the column of metadata sorted and another column of metadata. For example, when sorting the data in FIG. 1 based on the Role ID 112 column of metadata, it can be observed that the results of the Channel ID column 110 match those produced by sorting Role ID 112. The compressed entries under the Graph metadata column 216 (graph state) are lines that are positioned similarly to the scheme discussed above with regard to Expt 210, but are changeable depending upon the state of the visualization of the line and data in that row. Thus, a line appears on the right hand side of the column when the row is shown in a compressed view, but the line changes to the left hand side of the column (along, with, optionally, a "+" entry) to indicate that the line is shown in a non-compressed view.

Figure 3:
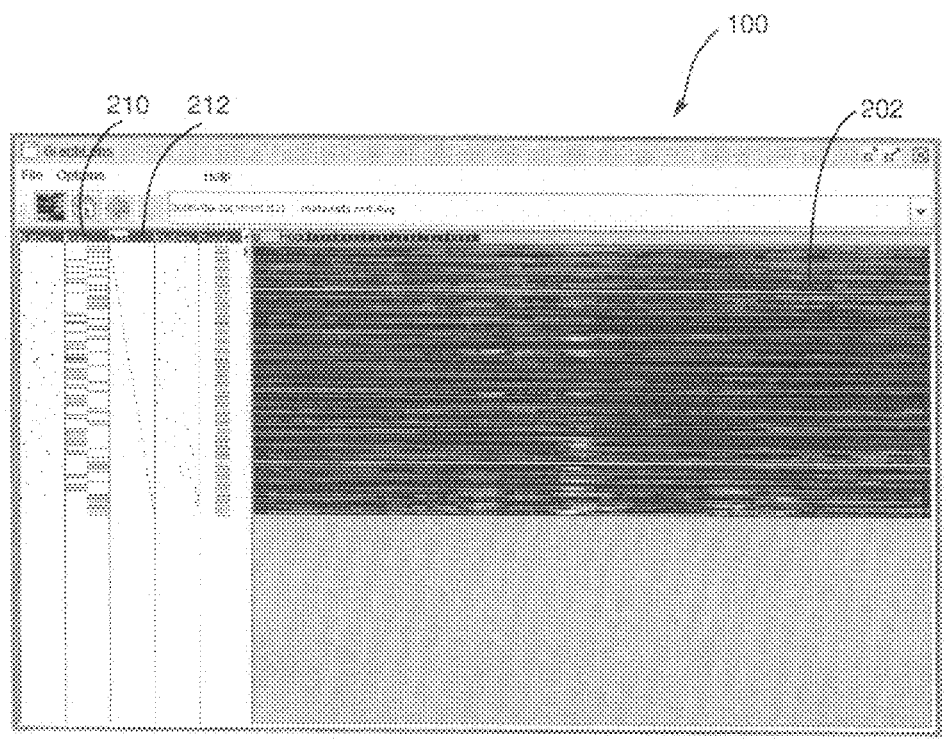
FIG. 3 shows the graphs and metadata of the visualization of FIG. 2 having been sorted by the "average value" metadata values associated with the graphs.

The metadata 204 provided with the line graphs 202 in the visualization can be used as a tool for sorting the line graphs 202 and associated metadata 202. Thus, for example, if a user wishes to sort the graphs 202 according to average value order, by simply mouse-clicking on the metadata header 212 for Avg., the system sorts the rows of the display from lowest average value to highest average value as shown in FIG. 3. Another mouse click on the Avg header 212 reverses the sort order and displays the graphs from highest average value to lowest average value. The sort operations performed are standard sorting techniques, either numerical or alphabetical, depending upon the underlying data. In the example shown, a merge sort algorithm was used (http://linux.wku.edu/~1amonm1/algor/sort/merge.html), which is well-known in the art. However, any standard sorting algorithm could be used (e.g., quicksort http://www.nist.gov/dads/HTML/quicksort.html, or the like).

Figure 4:
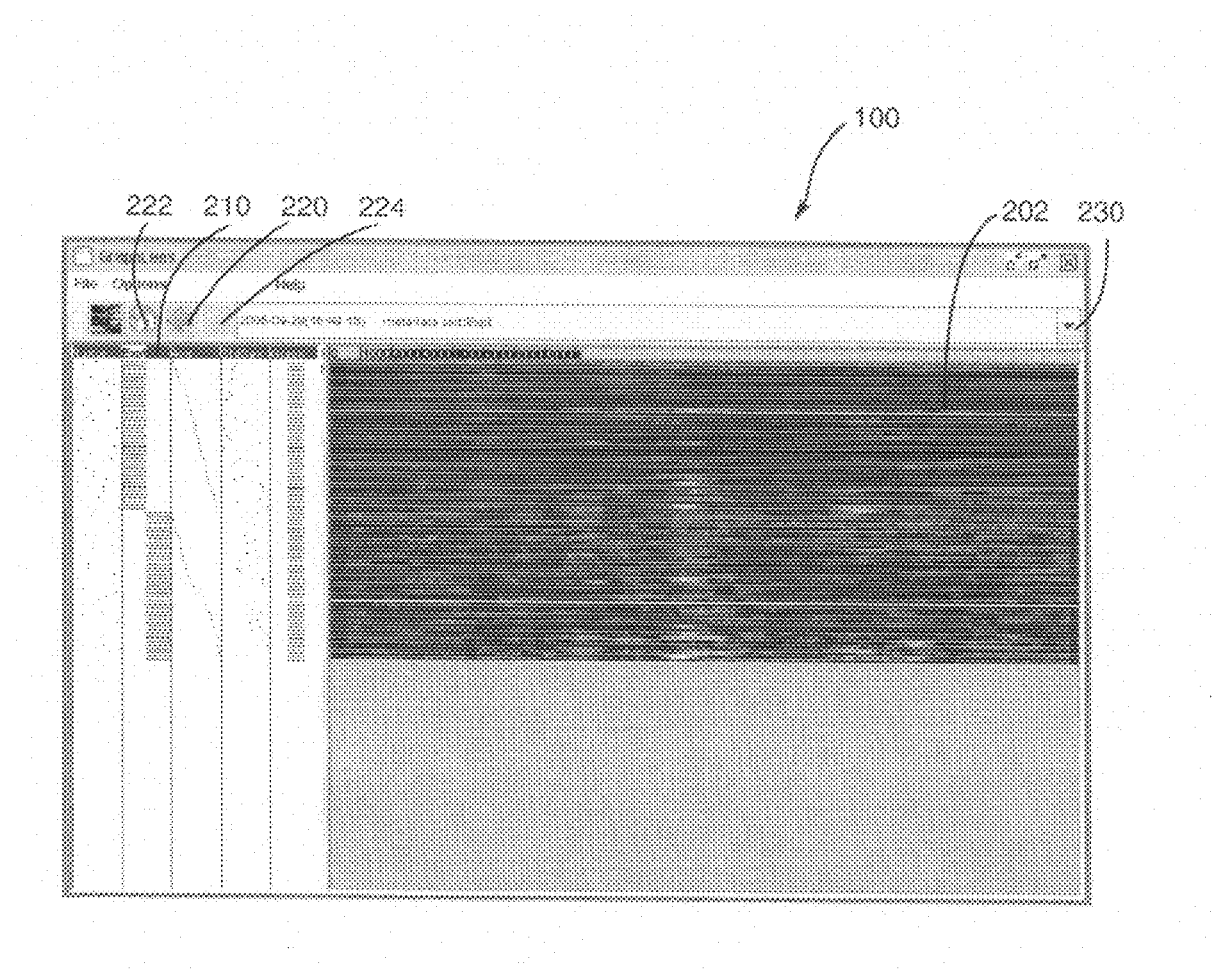
FIG. 4 displays the results of a multi-stage sorting operation, the results of FIG. 3 having been further sorted by the experiment type ("Expt") metadata values associated with the graphs.

Further, the system allows multi-stage sorting. For example, after sorting as described above with regard to FIG. 3, the user may be interested in comparing the gene expression data all together and/or the CGH data all together. By mouse clicking the experiment header 210 in the sorted display of FIG. 3, the system then sorts the data, that has already been sorted according to average value, further according to experiment type, as shown in the user interface 100 display in FIG. 4. The result is a display of the CGH experiment data, sorted from lowest average value to highest average value, followed by a display of the gene expression data, sorted from lowest average value to highest average value. Note that by mouse-clicking header 210 a second time, the system would display the gene expression data, sorted from lowest average value to highest average value, followed by the CGH experiment data, sorted from lowest average value to highest average value. Note that multi-stage sorting is not limited to two stages of sorting, as more than two stages may be executed. For example, a further sort base on Name could be performed after performing the sorts on Avg and Expt, as described above. In other examples, other categories of metadata may be provided upon which to sort, e.g., normal versus diseased tissue samples, drug responders versus non-responders, etc.

The user interface further includes navigational tools for moving from one visualization of data to another, that function much like the backward, forward and home buttons on a browser. For example, by mouse clicking on the "back" button or arrow 220 in the visualization of FIG. 4, the user interface displays the most recent previous display, i.e., the visualization shown in FIG. 3 in this case. If the user were to select or mouse-click the home button 222 in the display of FIG. 4, the user interface 100 would display the visualization shown in FIG. 2. The arrow for the forward function button 224 is not displayed in FIG. 4 because there are no more recent visualizations to display. However, if the user navigated back to the visualization of FIG. 3 by clicking button 220 in the visualization of FIG. 4, then both forward 224 and back 220 arrows would be displayed, as both forward and backward navigation would be possible from the resultant view. The system maintains a log of all views generated for navigation through the views using the controls 220, 222 and 224, or a drop down menu (not shown) may be displayed by selecting feature 230, to display the history, and the user can select a view directly from the history.

Figure 5:
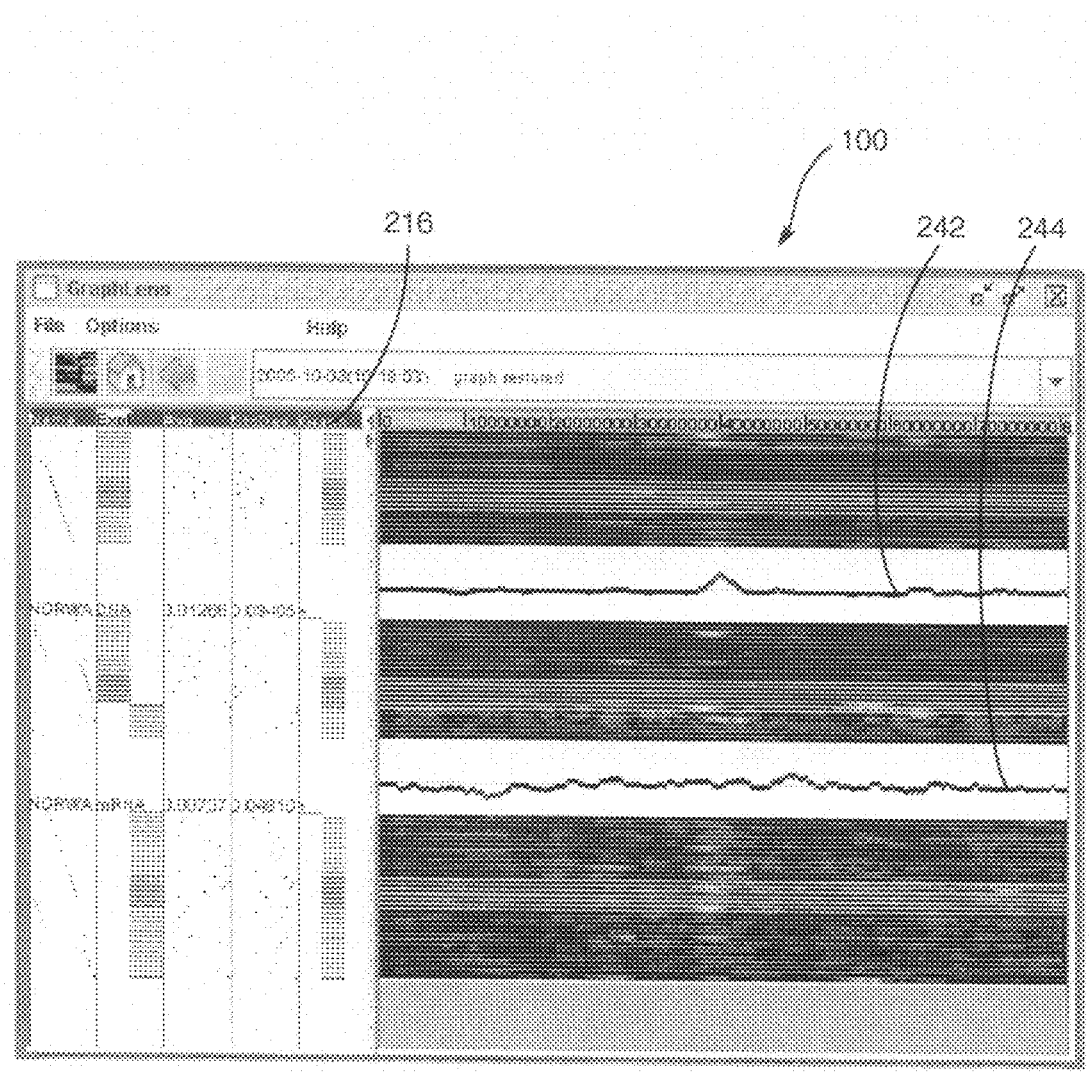
FIG. 5 shows an example of a collection of line graphs and metadata in which two line graphs have been opened, and the associated metadata with the line graphs are displayed in a first or original format (in this case, alphanumeric).

User interface 100 further includes a feature for "opening" or expanding a compressed graph by simply mouse clicking on that line graph. Note that any number of line graphs may be expanded using this feature, up to the allowable space provided in the window of the user interface. In the example of FIG. 5, two line graphs 242 And 244 have been opened. Note also that the metadata associated with each line graph has also been opened/decompressed, so that the actual values of each metadata cell in those lines are now displayed. Also, as mentioned above, the indicators under the Graph metadata category 216 for those lines have change so as to be displayed in the left hand sides of the cells, along with a "+" indicator.

Note that graphs and associated metadata can be opened by clicking on the graph itself, or any where along the same line that the graph is on in the associated metadata table 204. A closed graph is represented as a "ribbon" where the y coordinate of the graph is represented by a color gradient, as described above. An open view of the graph is a two-dimensional x-y plot of the graph. Accordingly, switching from an open view to a closed view and vice versa does not involve compression/decompression in the classical sense, but rather changes the rendering of the view from a normal x-y plot ("open" or "decompressed" view) to a substantially one-dimensional ribbon view, with y-values represented by color coding ("closed" or "compressed" view). In the horizontal direction, if there are more x-values then there are pixels available to plot these values, then averaging (pixel averaging) may be applied to represent the data in the space available. This may be accomplished by a simple averaging of pixels to reduce the horizontal resolution, or bi-cubic averaging, or some other averaging technique. Additionally, when switching from the closed view to the open view, the opening operation is animated, first showing the ribbon (closed view) followed by a relatively small scale (in the y-direction) x-y plot, which is sequentially increased to full scale in the y-direction. This gives the user the visual impression of "growing" the ribbon view into an x-y graph.

Figure 6:
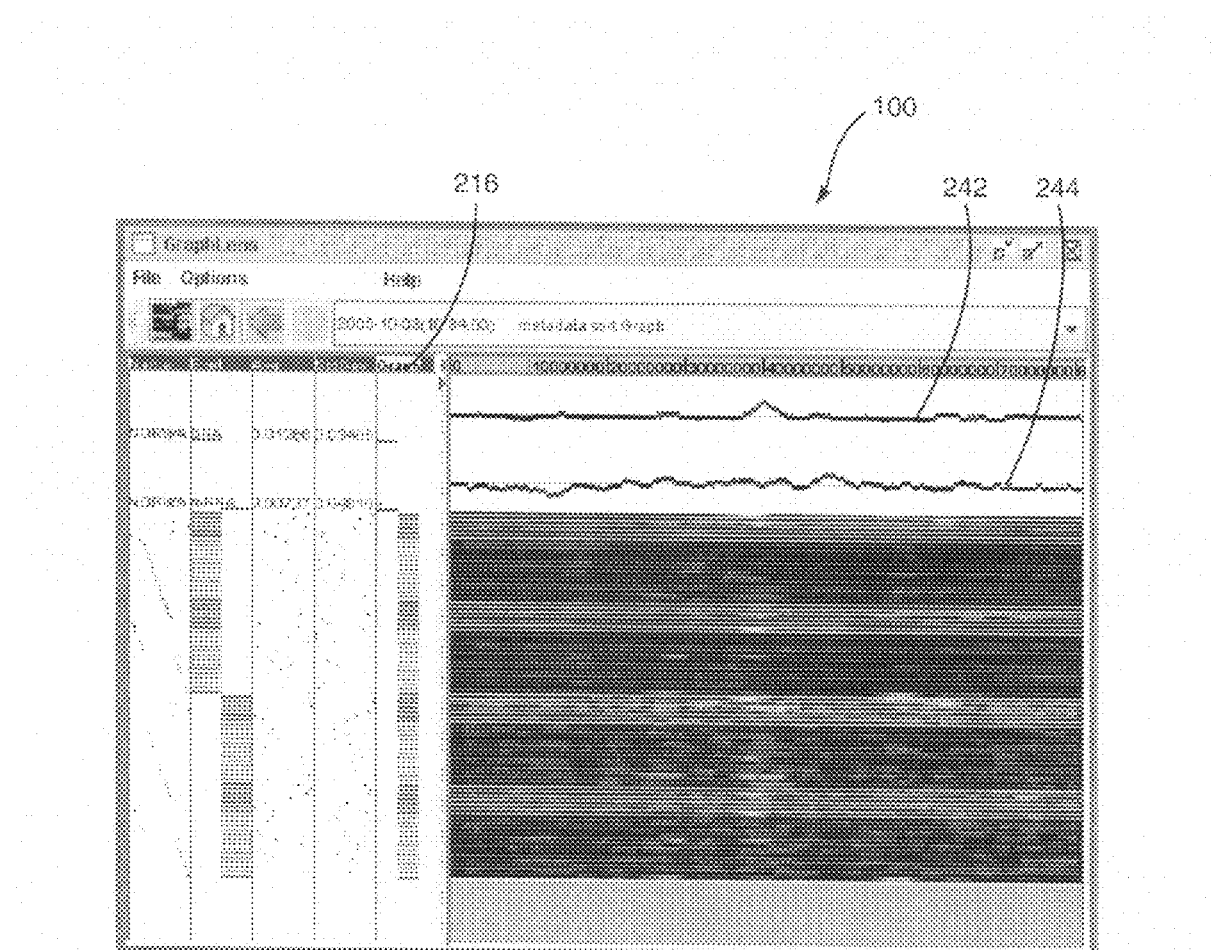
FIG. 6 shows the open line graphs of FIG. 5 having been sorted to be displayed together, the sort being performed on the graph state (Graph) metadata column.

The opened graphs 242 and 244 in FIG. 5 may be easily manipulated by a user for side by side comparison by simply sorting based upon the Graph 216 category, by clicking on the header of category 216, for example. The results of this sort are shown in FIG. 6.

Figure 7:
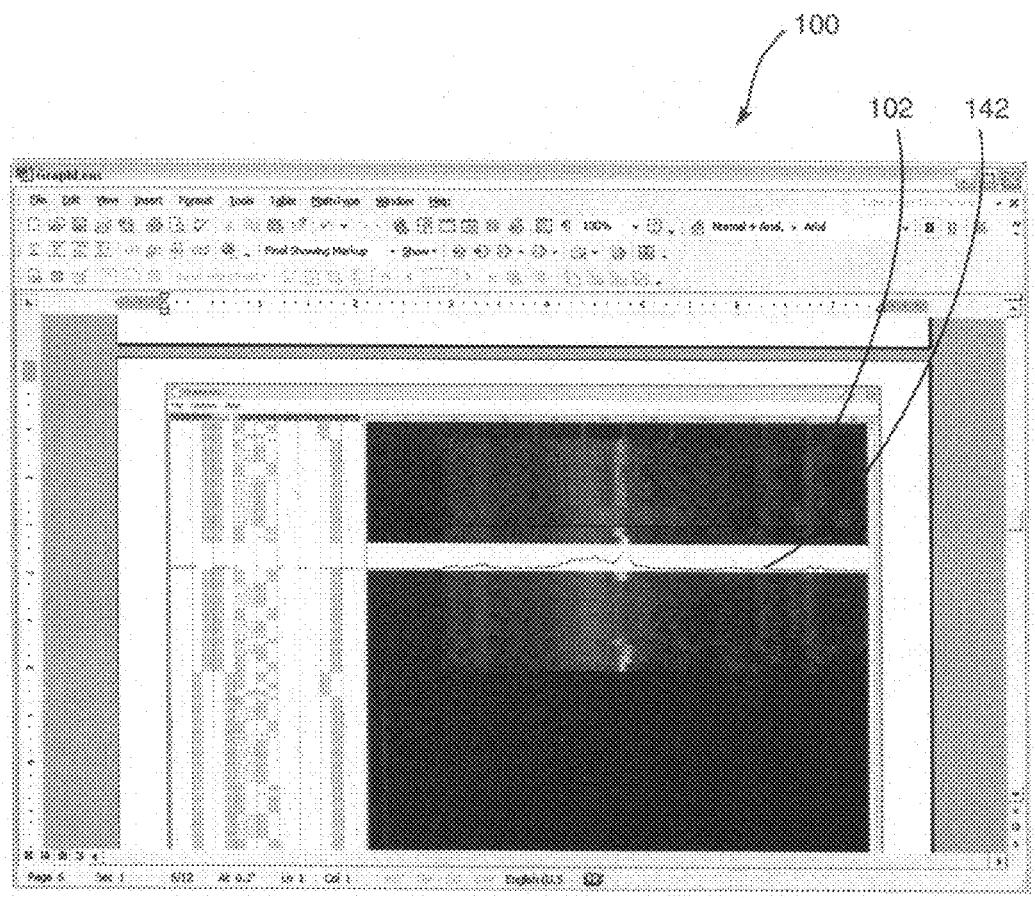
FIG. 7 shows an example in which one graph and associated metadata have been opened, all other graphs being visualized as a compressed view and their associated metadata being displayed graphically.
Figure 8:
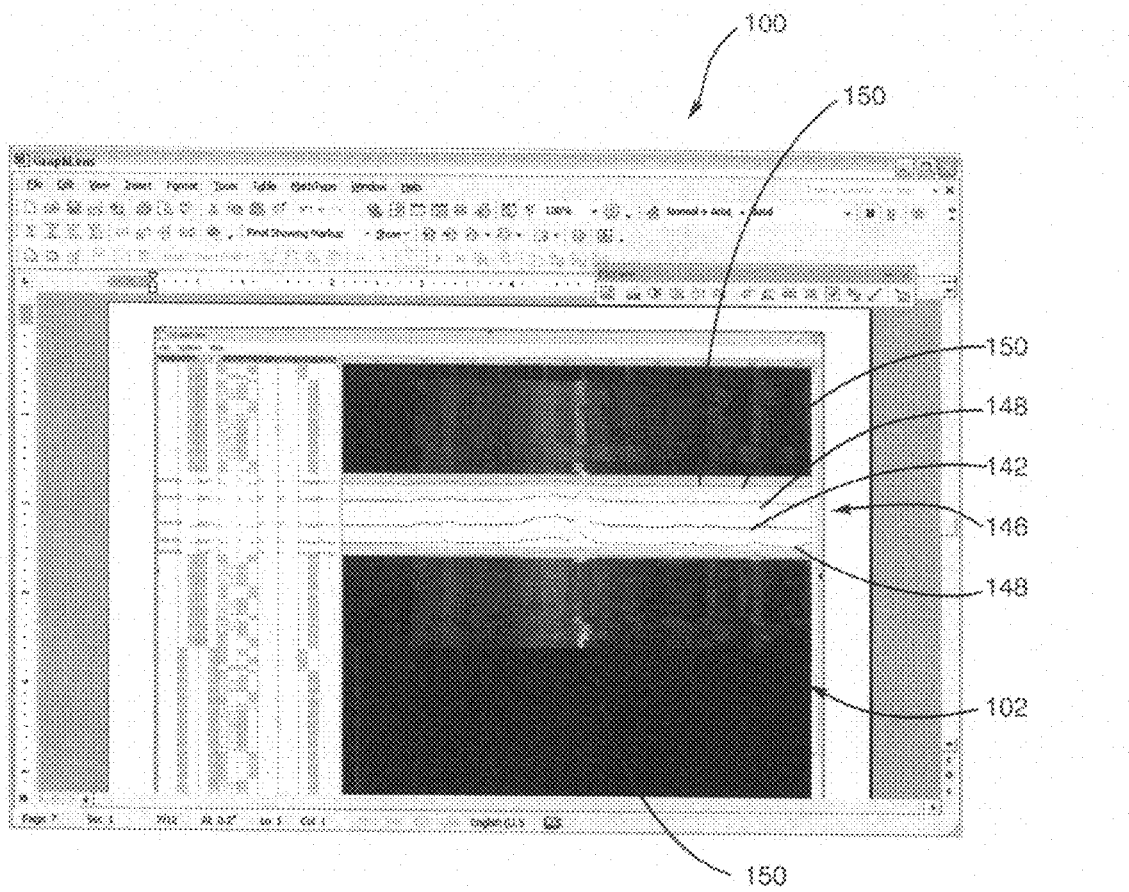
FIG. 8 shows a lens view function having been employed to open line graphs adjacent to the open graph shown in FIG. 7. The associated metadata values of all graphs opened are also displayed in the first format.

FIG. 7 shows an example in which only one graph 142 has been opened, in the same manner as described above with regard to FIG. 5. A lens feature is provided for viewing the selected graph 142 and adjacent graphs, for example through use of the "Alt" button and mouse clicking on the graph 142, resulting in the lens view 146 shown in FIG. 8. The line graph 142 that was originally opened is displayed largest (e.g., expanded to the most zoomed or magnified representation in the display) Neighboring line graphs 148 are opened, so as to be displayed in magnified view as well, although at a lesser vertical magnification or scale than what line graph 142 is displayed at. In the example shown, line graphs 142, 148 and 150 are displayed in progressively decreasing smaller relative vertical scale, to communicate the visual impression of the transition from the zoomed line graph 142 down to the fully compressed line graphs 102. Although useful, it is noted that displaying the zoomed line graphs in progressively decreasing vertical scale in both directions away from the largest-zoomed line graph 142 is not necessary to the invention, as other display schemes may be alternatively employed. For example, line graphs 148 and 150 may all be displayed in the same vertical scale, although a smaller vertical scale than that which line graph 142 is displayed in. More or fewer line graphs may be displayed in a zoomed scale adjacent line graph 142. Line graphs may be expanded adjacent only one side of the selected line graph 142 (either above or below). Of course there are many other display schemes that may be employed alternatively to those listed, as would be readily apparent to one of ordinary skill in the art. In any of these schemes, the x-y graphs of the open views may also be color-coded in the same manner as the closed views for easier correlation by the user when comparing the x-y open views with the closed views. This also helps to clarify to the user that a single y-axis is not displayed in the lens view of multiple, open graphs, but rather there are multiple y-axes, as each open graph is drawn to its own individual y-axis.

By displaying neighboring line graphs 148,150 in a zoomed scale (whether the same scale as line graph 142, decreasingly smaller vertical scales in directions away from line graph 142, or some other display scheme) in the lens view 146, a viewer is provided the opportunity to view details of the immediate neighborhood of the selected line graph (e.g., line graph 142). Thus this feature is useful to compare details of neighboring line graphs/experimental results. This feature is further useful to correct slight navigation errors. That is, when in the fully compressed form 102, the user may make a selection error among the rows in compressed form. For example, in the example shown in FIG. 8, the user may have actually had the most interest in viewing the details of the line graph 150 that is shown displayed above line graph 142 in FIG. 8. In this case, when presented with the visualization of FIG. 8, the user may simply click on or otherwise select line graph 150 that was originally intended to be selected for closer observation. The system then redisplays the line graphs to have a visualization similar to that shown in FIG. 8, but where the line graph 150 shown above line graph 142 in FIG. 8 is now displayed to have the largest vertical scale, with line graphs displayed in decreasingly smaller vertical scale below and above the displayed line graph 150.

The user interface 100 provides a feature for repositioning the lens view 146 over a different set of line graphs, such as by selecting the "Alt" button and left mouse clicking on the lens view 146 and dragging it over the line graphs that the user desires to be opened/zoomed to a more detailed view of those line graphs. Further, the lens view 146 may be expanded or contracted (resized) vertically to include more or fewer line graphs in the lens view 146, such as by using the same controls, with the difference being that the cursor is on one of the boundaries (upper or lower) of the lens view 146 for resizing, versus being positioned inside of the boundaries for moving the lens view 146. When resizing to shrink the lens view (i.e., reduce the number of expanded line graphs shown), by continuing to drag in the direction to reduce the number of opened lines displayed, the user can ultimately close the lens view completely, so that no line graphs are shown in a zoomed view and all are compressed. Alternately, by mouse clicking on the opened lens view 146, this closes the lens view 146 so that the line graphs previously displayed in the lens view 146 are again displayed in the compressed view.

Figure 9:
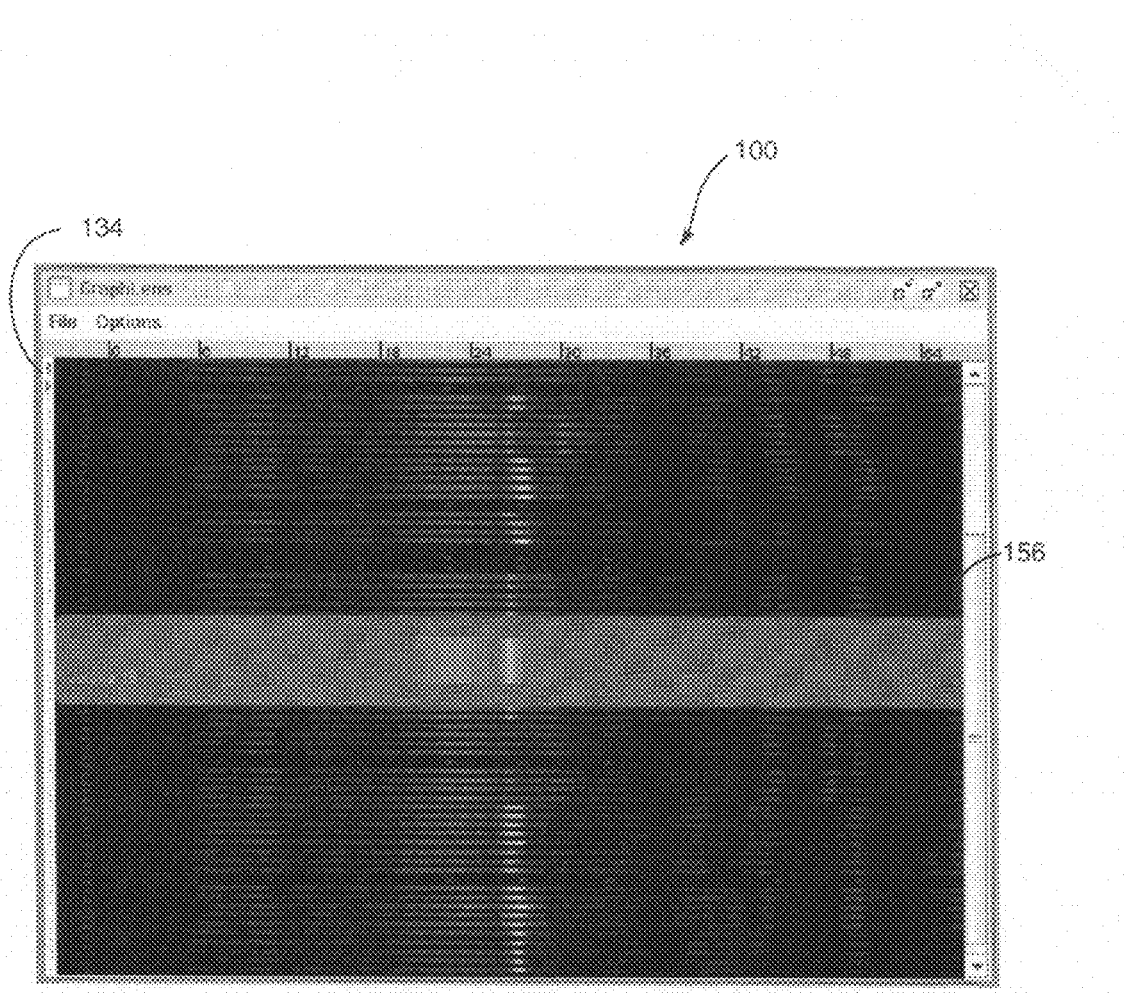
FIG. 9 shows another lens or lens view that magnifies the one-dimensional closed (compressed) views of the data rows that are included within the lens view.

Alternatively, another lens or lens view 156 may be provided, as shown in FIG. 9 that magnifies the one-dimensional closed (compressed) views of the data rows that are included within the lens view. The "magnification" provided by the lens view is performed by drawing a progressively wider version of the ribbon in a direction toward the center of the lens. The ribbon, or compressed view is drawn with a one-pixel thick line and a Java (Sun Microsystems) application program interface (API) is used to stretch the pixels in the one-dimensional strip to a desired height in the second dimension. This feature may be useful to facilitate a user's selection of a particular graph or row of data to view as an open view, when there are a large number of data rows visualized and thus the ribbon strips (one-dimensional, compressed views) are vary narrow, making it difficult to pick out and/or select on a single row in the view when it is not magnified. In the view shown in FIG. 9, the user has selected button 134 or dragged the right border of the metadata table view to the left to completely close the view. A tooltip may be provided to display the name or other identifying metadata of one or rows of data that are magnified by the lens view (e.g., see "Axona 18" in FIG. 9, which identifies the name of the wheat strain sample in the magnified view). Lens view 156 may be manipulated by the user in any of the ways described above with regard to lens view 146, for example to widen or narrow the lens 156 to magnify a greater or less number of rows of data than presently, or to drag the lens 156 over a different set of rows of data to be magnified.

Figure 10:
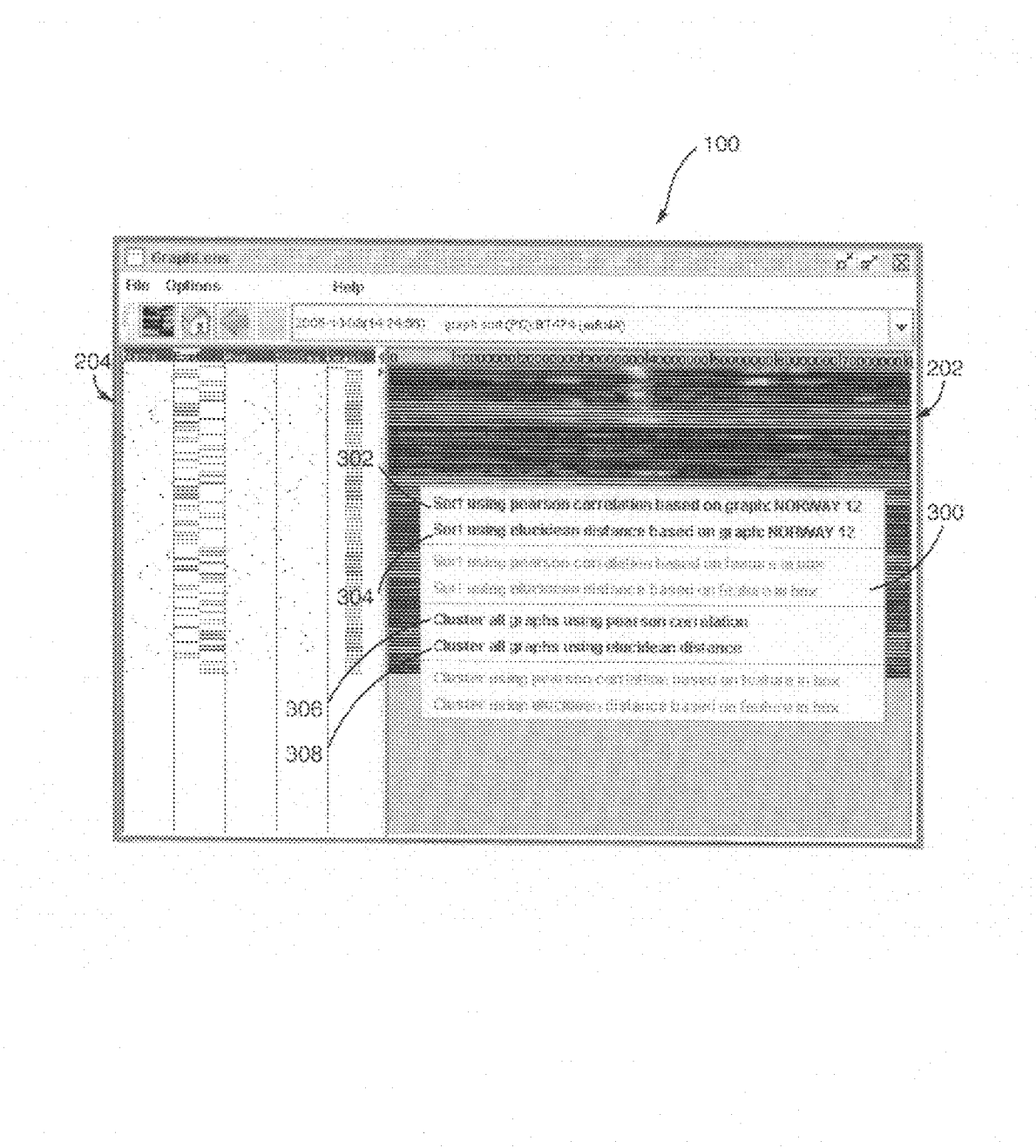
FIG. 10 illustrates sorting and clustering features provided by the user interface for sorting and clustering based on the line graph data.

In addition, or alternative, to the sorting features provided for sorting based upon data in the metadata table 104,204, the system also provides sorting features that sort based upon the line graphs 102,202. FIG. 9 shows a pop-up menu that is displayed upon right mouse clicking on a line graph in the collection of line graphs 202, that provides options for sorting. Note that the line graph selected may be compressed or opened, both when selecting it for a sort function, as well as during the sort, and is displayed in the same state (compressed or open) after the sort. Further, other graphs may be open during any of the sorting functions described herein, and are still displayed as open after the sort has completed. In the example shown in FIG. 10, the line graph with Name "NORWAY 12" was selected by right clicking. At this time, the user is provided with sort options, including sorting (similarity sorting), using Pearson's Correlation function or using a Euclidean distance algorithm 304. Of course, the present invention is not limited to using Pearson's Correlation or Euclidean distance algorithms to calculate distances between line graphs, as other distance calculation algorithms may be substituted, as would be apparent to one of ordinary skill in the art (e.g., Cosine measure, Spearman correlation etc.).

In any case, the distances between the selected line graph and each other line graph, are calculated, respectively, and then the display of the line graphs is arranged with the selected graph at the top, the next line graph having been calculated as having the closest distance to the selected graph, etc.

Figure 11:
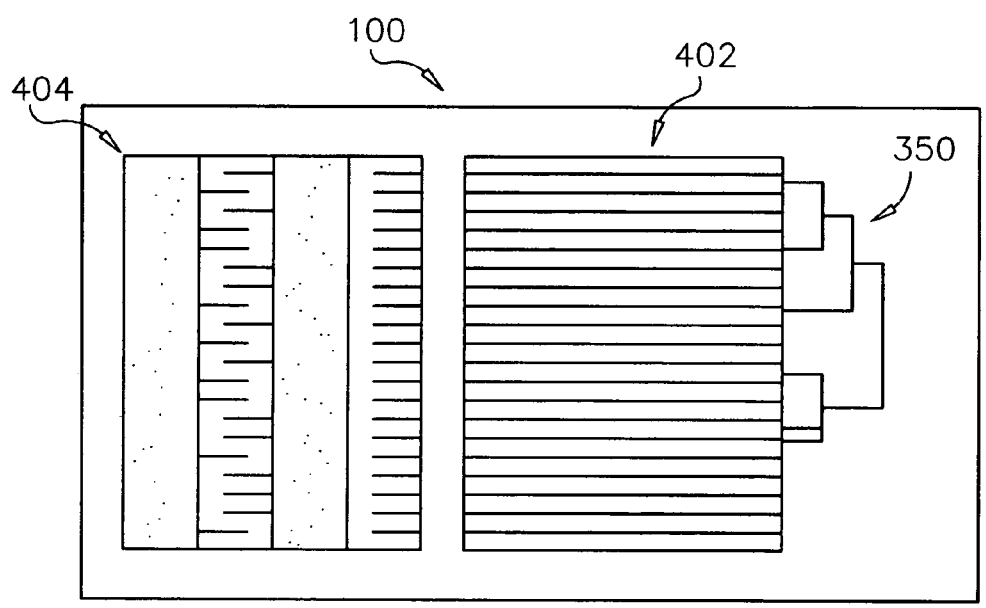
FIG. 11 schematically illustrates a tree structure identifying clustering results.

Another function provided as shown is provided by features for directly hierarchically clustering line graphs 102, 202, based on either Pearson's Correlation 306 or Euclidean distance 308. As with similarity sorting, clustering by the present system is also not specifically limited to the use of either Pearson's Correlation or Euclidean distance algorithms, as other known unsupervised clustering algorithms could be substituted as would be readily apparent to one of ordinary skill in the art. Also, supervised clustering techniques may be used, such as K-Means or other known algorithms for supervised clustering. When selecting a clustering function, the distance calculations are all based upon a line graph that is selected by the user. Rather, distance calculations are performed between each line graph with respect to each other line graph in the set 102,202, and then the results are grouped (clustered) by similarity. The line graphs are then displayed in an order of clustering determined by the clustering calculations. Additionally, a tree structure may be displayed alongside the line graphs when displayed after a hierarchical clustering process, to show the clustering relationships among the line graphs and sub-clusters. FIG. 11 schematically illustrates a tree structure 350 adjacent compressed line graphs 402 having been hierarchically clustered (along with concurrent repositioning of the metadata in metadata table 404).

Figure 12:
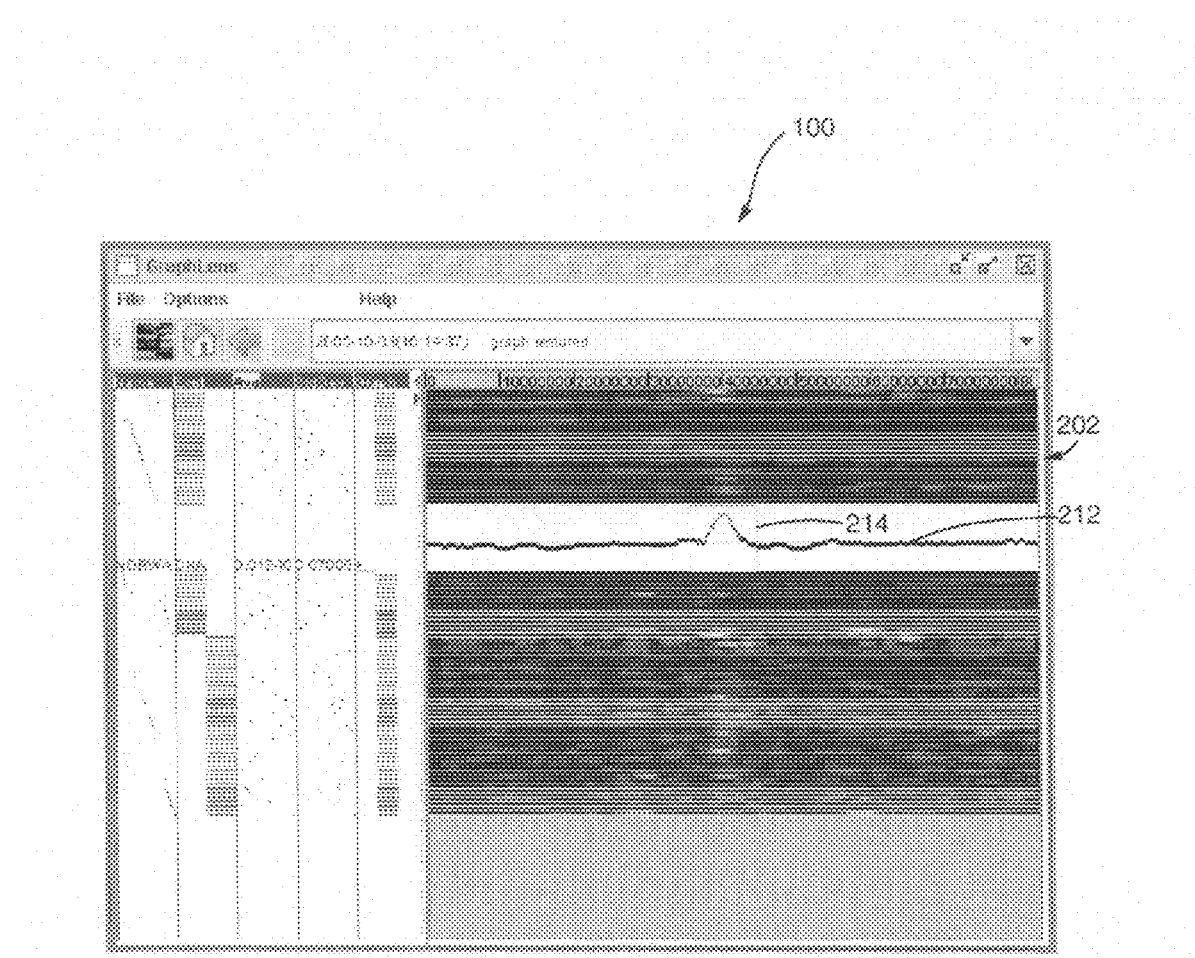
FIG. 12 shows a feature for selecting a portion of a graph upon which to perform similarity sorting, or to identify the same respective portion in all graphs for clustering based upon the identified portions.
Figure 13:
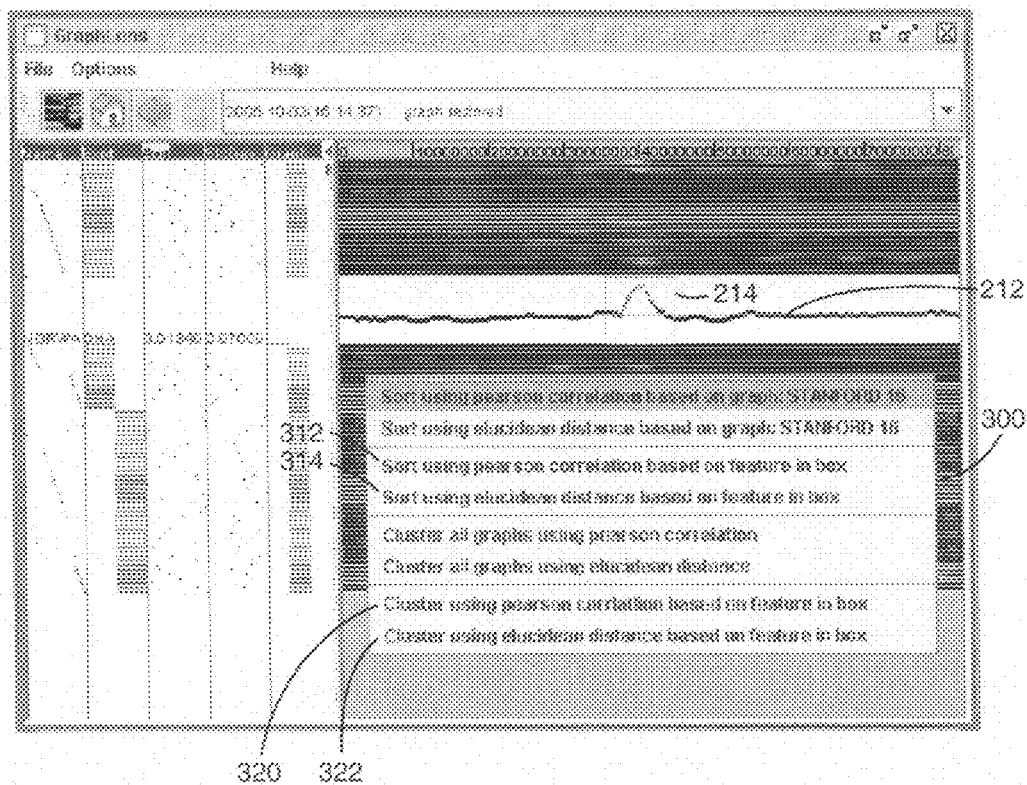
FIG. 13 shows the sorting and clustering features provided by the system for operations with regard to a selected portion(s) of a graph(s).

Similarity searching with regard to a line graph may be performed with more specificity, for example, based upon one or more selected portions of a line graph. FIG. 12 shows a user having selected a portion of the line graph 212 for similarity sorting with respect to that portion of the line graph contained within selection box 214, as the user may find the peak in this portion of the graph interesting for some purpose. To execute such a search, the user first opens the graph of interest (in this example, graph 212) by left mouse clicking on it, as noted above. The selection upon which to base the search is then made by establishing selection box 214 around that portion by pressing the "Ctrl" or "Shift" button while the cursor is at one of the ends of the selected portion and then dragging the mouse to drop the cursor at the other end of the portion to be selected. Once the selection box 214 has been placed where desired, a right mouse click displays the pop-up menu 300 as shown in FIG. 13. If at least one selection box 214 has been drawn/established, as in the example of FIG. 12, then pop-up menu 300 displays the additional options of sorting based on only that portion(s) of the selected graph in the selection box(es) 214. The similarity sorting algorithms available are the same as for the similarity searches based on an entire line graph, as described above. In this example, the user may select to perform a similarity sort base on the portion of graph 212 in selection box 214, using Pearson's Coefficient 312 or Euclidean distance 314.

Figure 14:
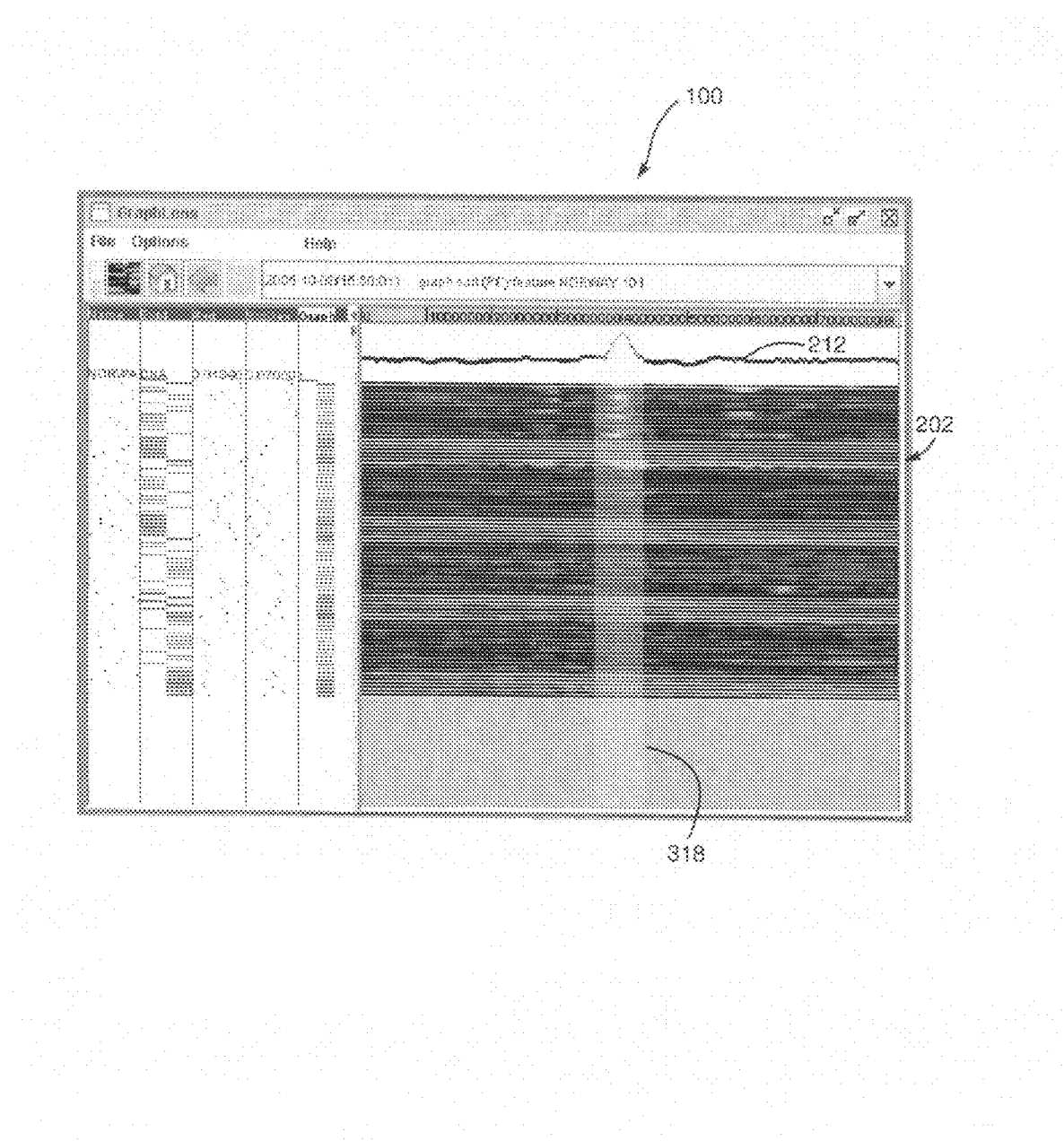
FIG. 14 shows the results of a similarity search base on the selected portion in FIG. 13, using Pearson's Correlation coefficient.

FIG. 14 shows the results of a similarity search base on the selected portion 214 of graph 212 in FIG. 13, using Pearson's Correlation coefficient as the distance algorithm for calculating distances between the selected portion, and corresponding portions of the other graphs 202 in the set. This example is illustrative in that the graphs that are brightly colored in the selected regions can be readily observed to be grouped pretty near the selected graph 212, Note also that the system highlights the selected region upon which the sort was calculated with sort band 318, which may be color-coded (e.g., yellow, in this example) to visually indicate the data subjected to the sort. Note that clustering may be carried out on a selected portion or portions of the graphs by selecting either feature 320 or 322 in pop-up menu 300 after selecting one or more regions of the collections of graphs 202 upon which to perform a clustering operation. Note that the selection is made in the same manner as when conducting a similarity search as described with regard to FIGS. 12-13, but that when selecting a clustering operation based on the selection, the system recognizes that all corresponding regions of all graphs are selected so that the clustering is performed in the same manner as described above with regard to a full line graph operation, only based on corresponding selected portions of those graphs. That is, the clustering operations are not performed with regard to the selection of the particular line graph from which the selection was initiated.

Figure 15:
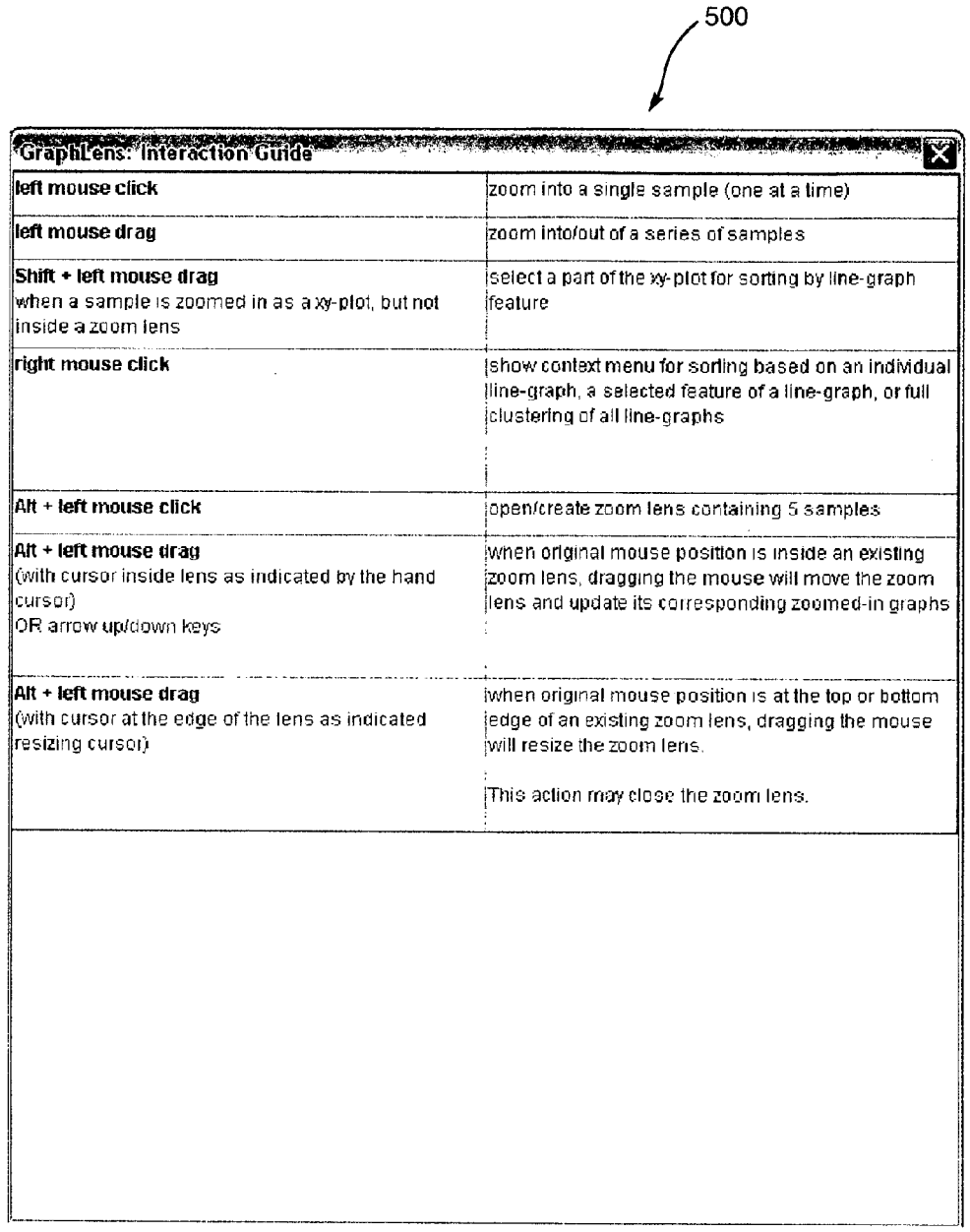
FIG. 15 illustrates an interaction guide provided by the user interface to guide users regarding the key and mouse strokes needed to actuate the various functions of the system.

By mouse clicking the "Help" tab at the top of user interface 100, an Interaction Guide 500 is displayed, as shown in FIG. 15, to guide the users for the key and mouse strokes needed to actuate the various functions of the system described above.

Figure 16:
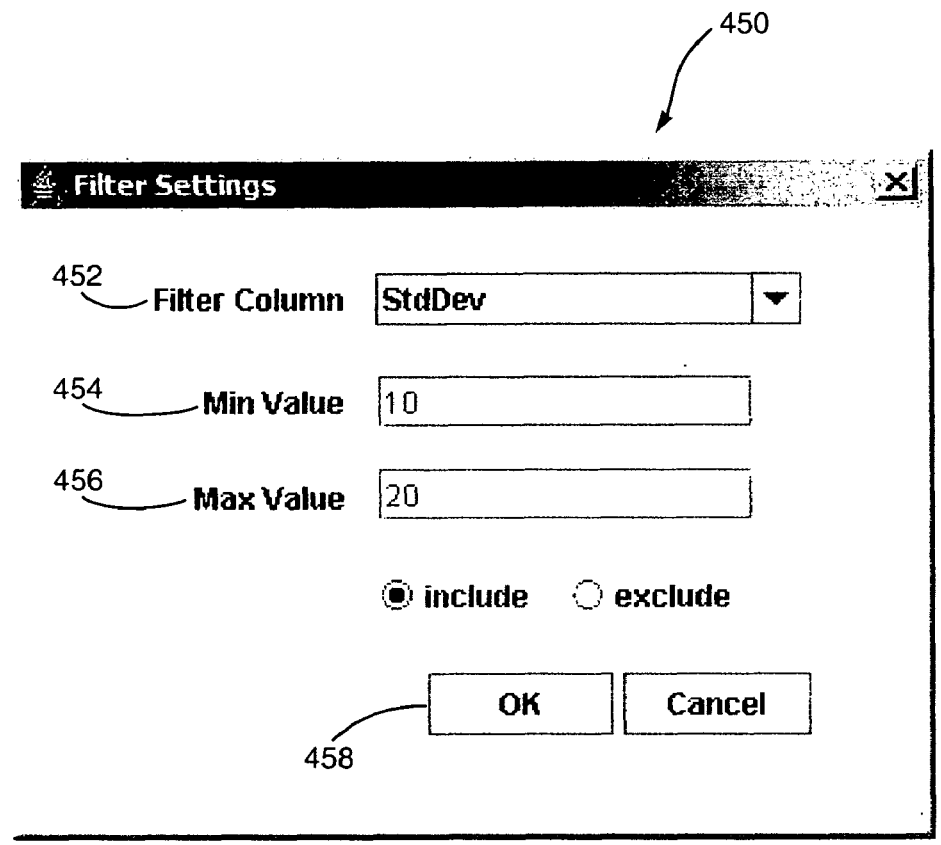
FIG. 16 shows an example of a tool used for filtering as described herein.

As noted above, the system operates to sort the lines of data (metadata and line graphs) whether one or more line graphs (and associated metadata) are open (decompressed) or not. Alternatively, filtering may be applied to perform the desired operations (e.g., sorting procedures, clustering, etc.) only with regard to the graphs (and metadata) that are open. Filtering may also be performed based on user specification of metadata values, for example. FIG. 16 shows an example of a tool 450 that may be selected in user interface 100 by a user to choose a particular metadata column and selected limits for filtering to consider only rows of data having metadata values in the selected metadata column that fall within (or outside) the limits set by the user. The example shown in FIG. 16 refers back to the data shown in FIG. 1. In tool 450, the user has selected the standard deviation metadata column (StdDev) (not shown in the view of FIG. 1), as the column of metadata upon which to perform the filtering operation (Filter Column 452). Minimum (Min Value 454) and maximum (Max Value 456) limits have been set by the user to 10 and 20, respectively, and the user has chosen to include all rows of data for which the standard deviation value is greater than or equal to 10 and less than or equal to 20. Alternatively, by selecting "exclude", the user could have chosen to exclude the rows of data just described and consider only rows of data for which the standard deviation value is less than 10 or greater than 20. By selecting OK, operations going forward are subjected to the filtering operation according to the limits set in tool 450. In this example, only the rows of data pertaining to the samples will be further considered after filtering, since the internal controls (ladders) all have standard deviation values less than 10. For non-numerical data (e.g., categorical metadata), a similar dialog tool is provided that allows the user to select which categories/names of that metadata column to include or exclude.

Thus, by filtering in a manner described, the rows of data that are included by the specified filtering operation are the only rows that are considered in operations going forward, such as sorting, clustering, etc. This results in a reduced set of data to visualize. The rows of data that are no longer considered, as being filtered out, may be simply hidden from the visualization, or alternatively, may be removed from the internal data structures of the system.

Filtering may also be performed after performing one or more operations on a data set. For example, a graph may be selected and then a similarity sort performed in a manner described previously. After completing the sort, a user may filter the results using a filtering tool as described above, after which only those rows of data meeting the filtering criteria are displayed. This, of course also applies to operations performed only upon a portion of the graphs, such as the similarity sorting and clustering operations performed on selected portions of the graphs as described above, and also to sort operations performed using metadata values, in that filtering may be performed after the results have been achieved from any of these operations.

Of course, the data can be sorted to group all open line graphs together by simply sorting all of the data (open and compressed) based on the graph state metadata column (Graph 216) as described above. Additionally filtering may next be applied to view only the open graphs and discard the closed graphs so as not to be viewed, by using tool 450 as described above, and choosing Graph (graph state) as the column of metadata upon which to filter. Conversely, the user could select a filter to display only the closed graphs (and associated metadata) and not the open ones (and associated metadata).

A variety of further filtering mechanisms may be provided to further manipulate and visualize the data, including a filter for selecting or removing graphs based on matching criteria based either on the metadata or by matching to a predetermined graphical motif or statistical measure. Examples of this type of filtering would be to eliminate all graphs with a standard deviation above or below some preset threshold, or to display only those graphs having a mean value above or below some predetermined threshold.

In addition to computing similarity measures (e.g., distances) for purposes of sorting, the calculated similarity measures may also be displayed on the user interface as a column of metadata, with the values populating the column upon being calculated. In this case, this data can then be used for sorting by selecting the header of the metadata column containing the similarity measures, in the manner described above with regard to sorts based on metadata, as well as all other operations that may be performed on a column of metadata, as described herein.

Many techniques have been developed to find motifs in line graph data. Hochheiser, Interactive Graphical Querying of Time Series and Linear Sequence Data Sets, in Dept. of Computer Science. 2003, University of Maryland, provides a good overview of techniques for motif finding, and is incorporated herein, in its entirety by reference thereto. In this case a motif is a recognizable and characteristic pattern in the line graph curve. These techniques may be employed by the system for monitoring real-time data, data in which the resulting plotted graphs changes over time, wherein the plotted graphs may scroll across the display of the user interface, for example. For instance, it may be possible to detect the typical pattern for a heart murmur in an EKG (electrocardiogram). With a suitable motif finding algorithm it is possible to select and/or filter or remove graphs containing a suitable match to a motif of interest. Sorting or clustering of graphs based on motif-similarity as a distance/similarity measure may also be performed and then results of these processes may be displayed on user interface 100. In general, any of the existing time series query methods (e.g., see Hocheiser) can be used for selection, filtering or ordering of the graph data.

Dynamic line graphs (i.e., graphs that may change values over time, as the values are plotted and scrolled across the display of user interface 100) may be monitored in real time by the present system. As another medical example, a collection of EKG graphs resulting from real-time EKG measurements of a group of patients in an intensive care unit, may be monitored in real time. By comparing the EKGs in real time to a predetermined parameter, such as heart rate (beats per minute), for example, or a threshold amplitude, below which the heartbeat is considered to be abnormal, or some other medical indicator, the system may be set to automatically open any line graph exhibiting a change that exceeds the threshold, thereby alerting medical staff that there may be an abnormality occurring with the patient associated with that graph that opens. Thresholds may also be personally tailored to each patient. For example, the system may calculate the average heart rate for each patient over a period of time, and then a personal threshold may be set as one standard deviation above or below the average heart rate. Concurrently to opening a graph that exceeds a threshold, an audible alarm may be actuated. In this way, multiple patients may be monitored from a central location. Additionally, the system may be provided in a handheld, wireless unit for monitoring in field conditions, such as which may be useful in the military, or for paramedic use, for example.

Similarly, the system may be used for real time monitoring of environmental conditions from a plurality of sensors for different locations, for example to detect humidity, air quality, biohazards, etc., where, when a threshold is exceeded, the chart corresponding to the location of monitoring is opened by the system to indicate that further investigation may be needed in that area.

Thus, the present system facilitates visualizing and analyzing a collection of graphs, wherein each of the graphs may be aligned along one axis of a visualization, by aligning all of the graphs with respect to the one axis; compressing visualizations of the graphs in a direction along a second axis perpendicular to the first axis; displaying the compressed visualizations; monitoring the graphs to identify when any graph matches a predetermined motif or exceeds a predetermined threshold; and zooming each graph identified to match the predetermined motif or exceed the predetermined threshold, to display an open visualization of said each graph having a greater scale along the second axis than a scale of the compressed graphs.

All graphs displayed in an open visualization at any given time may be clustered to facilitate viewing graphs of interest to a user. Filtering may also be done to remove compressed graphs from display, if desired. Alternatively, filtering may be performed so as not to display the graphs in the open visualization state. Monitoring of dynamic graphs may be performed by time series querying.

The metadata in any of the examples above may be based on data supplied in the data file loaded into the system. However, columns of statistical metadata may be populated into metadata table 104,204 when computed at run time by the system, based on the data loaded into the system. This populated data can also be used for sorting, filtering or selecting graphs. For example, the mean and standard deviation of y-values of each graph may be computed and displayed in metadata table 104,204. Graphs may then be selected based upon statistical spreads. More complex statistics based on a combination of metadata and graphs may additionally or alternatively be calculated. For example an ANOVA (Analysis of Variance) calculation may be performed for graphs that correlate with a particular metadata classification. ANOVA calculations are described in greater detail in co-pending, commonly owned application Ser. No. 11/198,362, filed Aug. 4, 2005, Ser. No. 11/026,484, filed Dec. 30, 2004. Both application Ser. No. 11/198,362 and application Ser. No. 11/026, 484 are hereby incorporated herein, in their entireties, by reference thereto. This type of calculation may require user intervention to select the appropriate metadata for analysis. However, the calculated result can populate back into the metadata table 104,204 to allow subsequent sorting/selection/filtering of the graph data 102,202.

As described above, user interface 100 is provided for visualizing and manipulating a collection of graphs and metadata and includes a a display configured to visualize the collection of graphs in compressed form and the associated metadata as graphical representations of a first format; and a feature for sorting a column of metadata, wherein the collection of graphs and all associated metadata are sorted in the same order resulting from the sorting of the metadata in a selected column.

Additionally, a feature for selecting a graph from a visualization of at least a portion of the collection of graphs in compressed form is provided, wherein upon selecting the graph, the interface zooms at least the selected graph to display an open visualization of at least the selected graph having a greater scale along an axis of compression of the compressed visualization than a scale of the compressed graphs along the axis of compression, and wherein all metadata associated with each graph zoomed are zoomed to an open visualization of a first format, such as textual, numerical or alphanumeric, for example; and wherein at least the selected graph and associated metadata are displayed in the open visualization in a same order as occupied in the compressed form, with graphs and associated metadata not having been zoomed being displayed adjacent zoomed graphs and metadata.

A feature for sorting graphs based on similarity calculations may be provided, wherein the metadata associated with the graphs are sorted in the same order resulting from the sorting of the graphs.

A feature for multi-stage sorting may be provided, wherein after sorting based on the selection of a column of metadata, another column of metadata is selectable to perform the multistage sort.

A feature for zooming a plurality of the graphs to display open visualizations of the plurality of graphs having a greater scale along the second axis than a scale of the compressed graphs may be provided, together with a feature for displaying the at least one metadata value, aligned with each of the plurality of graphs having been zoomed in the greater scale, respectively, in the greater scale and in the first form of representation in the open visualization. A feature for sorting the graphs and associated metadata values to group the open visualizations together may be provided, as well as a feature for displaying the open visualizations and the compressed graphs with graphically represented metadata in an order resulting from the sorting.

A feature for zooming a plurality of the graphs to display open visualizations of the plurality of graphs having a greater scale along the second axis than a scale of the compressed graphs may be provided, with a feature for displaying the at least one metadata value, aligned with each of the plurality of graphs having been zoomed in the greater scale, respectively, in the greater scale and in the first form of representation in the open visualization, wherein the graphs and associated metadata displayed in the greater scale are displayed in a lens view. A feature for moving the lens view from a location of the zoomed graphs and associated metadata, to another location over a different set of graphs and associated metadata may be provided, wherein the different set of graphs and associated metadata are zoomed, wherein graphs previously zoomed in the lens view, but which are not in the new location, are displayed in the compressed view and the associated metadata are displayed graphically on a scale of the compressed view.

A feature for resizing the lens view to zoom greater or fewer graphs and associated metadata may be provided.

The user interface may include a feature for selecting a graph; a feature for sorting the order of all graphs by similarity calculations relative to the selected graph, wherein all other metadata values associated with the graphs are rearranged in a same order as the sorted order of graphs; and a feature for displaying the metadata values and graphs in an order resulting from the sorting.

A feature for clustering the graphs into clusters based on a clustering algorithm, may be provided, wherein all other metadata values associated with the graphs are rearranged with their associated graphs, respectively, into the clusters resulting from the clustering operation, and a feature for displaying the metadata values and graphs in an order resulting from the clustering may be provided.

A feature for displaying a graphical identifier of the clusters alongside the displayed graphs may be provided, e.g. a hierarchical tree identifying the cluster relationships.

The user interface may include a feature for selecting a portion of a graph along at least one region relative to the second axis in an open visualization, a feature for sorting an order of all graphs by similarity calculations of respective portions along the at least one region relative to the second axis, of all graphs to the selected portion, wherein all other metadata values associated with the graphs are rearranged in a same order as the sorted order of graphs; and a feature for displaying the metadata values and graphs in an order resulting from the sorting.

The user interface may include a feature for selecting a portion of all graphs along at least one region relative to the second axis; a feature for clustering the selected graph portions into clusters based on a clustering algorithm, and rearranging the graphs and all other metadata values associated with the graphs, according to the clusters resulting from the clustering, and a feature for displaying the metadata values and graphs in an order resulting from the clustering.

The user interface may include a feature for filtering the graphs and associated metadata values to provide a selected set of graphs and associated metadata values, wherein the selected set consists of less than all of the graphs and associated metadata values.

The user interface may include a feature for aligning all of the graphs with respect to one axis; a feature for compressing visualizations of the graphs in a direction along a second axis perpendicular to the first axis; a display on which the compressed visualizations are displayed; a feature for monitoring the graphs to identify when any graph matches a predetermined motif or exceeds a predetermined threshold; and a feature for notifying the user each time a graph is identified to match the predetermined motif or exceed the predetermined threshold.

The feature for notifying may include a feature for zooming each identified graph, to display an open visualization of said each identified graph having a greater scale along a second axis than a scale of the compressed graphs along the second axis.

Figure 17:
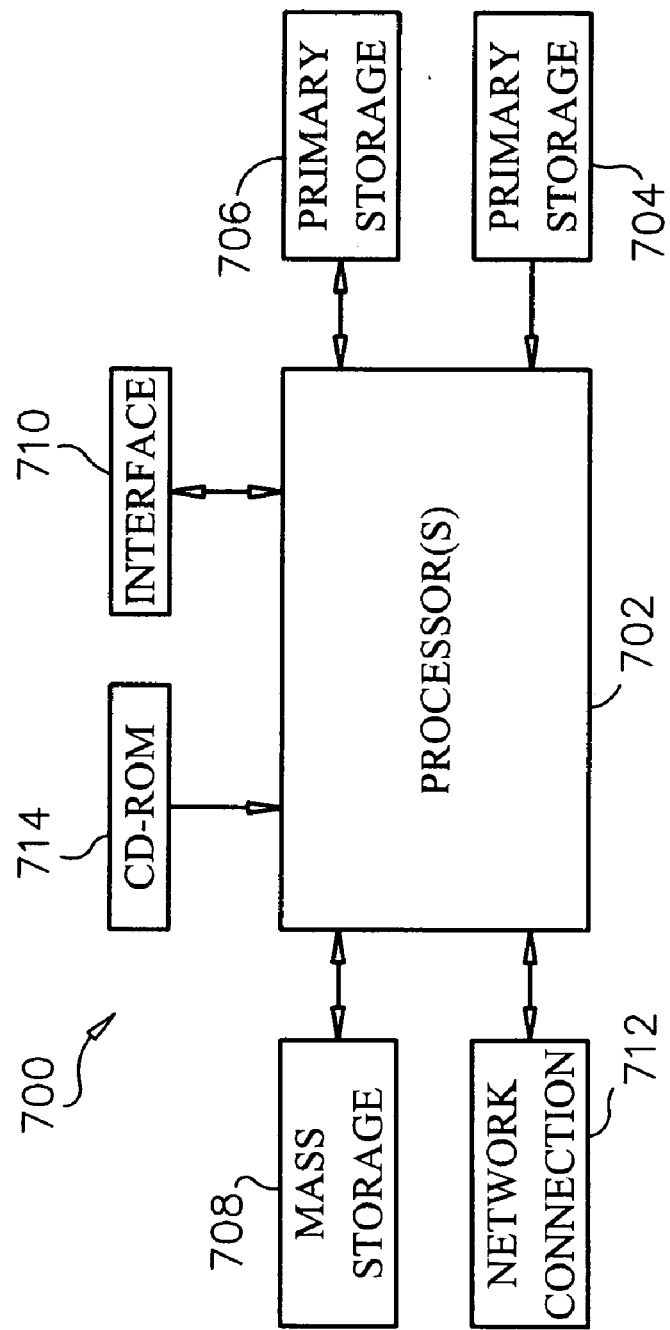
FIG. 17 illustrates a typical computer system in accordance with an embodiment of the present invention.

FIG. 17 illustrates a typical computer system in accordance with an embodiment of the present invention. The computer system 700 includes any number of processors 702 (also referred to as central processing units, or CPUs) that are coupled to storage devices including primary storage 706 (typically a random access memory, or RAM), primary storage 704 (typically a read only memory, or ROM). As is well known in the art, primary storage 704 acts to transfer data and instructions uni-directionally to the CPU and primary storage 706 is used typically to transfer data and instructions in a bi-directional manner Both of these primary storage devices may include any suitable computer-readable media such as those described above. A mass storage device 708 is also coupled bi-directionally to CPU 702 and provides additional data storage capacity and may include any of the computer-readable media described above. Mass storage device 708 may be used to store programs, data and the like and is typically a secondary storage medium such as a hard disk that is slower than primary storage. It will be appreciated that the information retained within the mass storage device 708, may, in appropriate cases, be incorporated in standard fashion as part of primary storage 706 as virtual memory. A specific mass storage device such as a CD-ROM or DVD-ROM 714 may also pass data uni-directionally to the CPU.

CPU 702 is also coupled to an interface 710 that includes one or more input/output devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 702 optionally may be coupled to a computer or telecommunications network using a network connection as shown generally at 712. With such a network connection, it is contemplated that the CPU might receive information from the network, or might output information to the network in the course of performing the above-described method steps. The above-described devices and materials will be familiar to those of skill in the computer hardware and software arts.

The hardware elements described above may implement the instructions of multiple software modules for performing the operations of this invention. For example, instructions for calculating and plotting moving averages may be stored on mass storage device 708 or 714 and executed on CPU 708 in conjunction with primary memory 706.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

That which is claimed is:

1. A computer-implemented method of visualizing a collection of graphs, each graph comprising an ordered set of pairs of values, each pair of values having a first value indicative of a first quantity along a first axis and a second value indicative of a second quantity along a second axis, said method comprising:
   providing a compressed display mode for each graph in which that graph is represented by a linear graph comprising a straight line along said first axis, said straight line having a visual property that varies along said first axis according to said second values, and said straight line being characterized by a width along said second axis,
   providing a compressed display in which all of said graphs are displayed in said compressed display mode, said straight lines corresponding to each graph being parallel to one another and being presented in an ordered sequence; and
   displaying for each linear graph at least one metadata value characterizing that linear graph, said metadata value being different from said values in that linear graph, positioning said at least one metadata value adjacent to that linear graph;
   wherein said at least one metadata value is represented by a graphical symbol having a dimension that varies according to said at least one metadata value.

2. The method of claim 1, further comprising:
   providing an expanded display mode for each graph in which that graph is represented by a two-dimensional graph aligned along said first axis with said linear graph, said two-dimensional graph being characterized by a magnification along said second axis;
   receiving input from a user identifying a first one of said linear graphs;
   providing an expanded display in which said identified linear graph is replaced by said two-dimensional graph corresponding to that identified linear graph, said two-dimensional graph and said unidentified linear graphs remaining in said ordered sequence relative to one another; and
   replacing the graphical representation of said at least one metadata value, adjacent to said identified linear graph by an alphanumeric representation of said at least one metadata value.

3. The method of claim 2, further comprising:
   replacing a second linear graph adjacent said two-dimensional graph by the two-dimensional graph corresponding to said second linear graph, said second two-dimensional graph, said two dimensional graph and all said unidentified linear graphs remaining in said ordered sequence relative to one another;
   replacing the graphical representation of said at least one metadata value adjacent said second linear graph replaced by said second two-dimensional graph by an alphanumeric representation of said at least one metadata value adjacent said second linear graph;
   magnifying said two-dimensional graph replacing said identified linear graph in a lens view to display said two dimensional graph in a lens view at a first scale along the second axis, said first scale being greater than a scale of the graphs that are not in the lens view, but in an unaltered scale along the first axis;
   magnifying said second two-dimensional graph in a lens view to display said second two-dimensional graph in the lens view at a second scale along the second axis, said second scale being smaller than said first scale and greater than said scale of the graphs that are not in the lens view, but in an unaltered scale along the first axis,
   displaying the at least one metadata values adjacent said two-dimensional graph and said second two-dimensional graphs in the lens view at said first and second scales respectively.

4. The method of claim 2, further comprising:
   selecting a portion of a graph along at least one region relative to the second axis in an open visualization;
   sorting an order of all graphs by similarity calculations of respective portions along the at least one region relative to the second axis, and of all graphs to the selected portion, wherein all other metadata values associated with the graphs are rearranged in a same order as the sorted order of graphs; and
   displaying the metadata values and graphs in an order resulting from said sorting.

5. The method of claim 2, further comprising:
   selecting a portion of all graphs along at least one region relative to the second axis in an open visualization;
   clustering the selected graph portions into clusters based on a clustering algorithm; and rearranging the graphs and all other metadata values associated with the graphs, according to the clusters resulting from said clustering; and
   displaying the metadata values and graphs in an order resulting from said clustering.

6. The computer-implemented method of claim 2, wherein the magnification of said two-dimensional graph along said first axis is equal to the magnification of said identified linear graph along said first axis and wherein the dimensions of the graphs in said compressed display mode remain unchanged.

7. The computer-implemented method of claim 2, wherein at least one other of said linear graphs is identified by said user, and each of said at least one other identified linear graphs is replaced by said corresponding two-dimensional graphs, and each of said metadata values adjacent to said at least one other identified linear graphs replaced by said two-dimensional graphs is represented in an alphanumeric form of representation.

8. The method of claim 1, wherein said at least one metadata value characterizing that graph is located in a column of metadata values of a same category, relative to all of the collection of graphs, and wherein said graphical representations of said metadata values in said at least one column are displayed for visually comparing the associated linear graphs, by relative location of a symbol within respective cells of said column.

9. The method of claim 1 wherein said at least one metadata value characterizing that linear graph is located in one of a plurality of columns of metadata values, each column containing metadata values of a same category, said method further comprising:
   selecting one of said columns of metadata values;
   sorting the order of metadata values in said selected column, wherein all other metadata columns and the corresponding graphs are rearranged in a same order as the sorted order of metadata value in said selected column; and
   displaying the metadata values and the corresponding graphs in an order resulting from said sorting.

10. The method of claim 9, further comprising:
providing an expanded display mode for each graph in which that graph is represented by a two-dimensional graph aligned along said first axis with said linear graph, said two-dimensional graph being characterized by a magnification along said second axis;
receiving input from a user identifying a first one of said linear graphs,
providing an expanded display in which said identified linear graph is replaced by said two-dimensional graph corresponding to that identified linear graph, said two-dimensional graph and said unidentified linear graphs remaining in said ordered sequence relative to one another; and
replacing the graphical representation of said at least one metadata value, adjacent to said identified linear graph by an alphanumeric representation of said at least one metadata value;
wherein said two-dimensional graph and said at least one associated metadata value are sorted and displayed in an order resulting from said sorting with all the unidentified linear graphs and metadata values corresponding to those unidentified linear graphs.

11. The method of claim 9, further comprising:
providing an expanded display mode for each graph in which that graph is represented by a two-dimensional graph aligned along said first axis with said linear graph, said two-dimensional graph being characterized by a magnification along said second axis;
receiving input from a user identifying a first one of said linear graphs,
providing an expanded display in which said identified linear graph is replaced by said two-dimensional graph corresponding to that identified linear graph, said two-dimensional graph and said unidentified linear graphs remaining in said ordered sequence relative to one another; and
replacing the graphical representation of said at least one metadata value, adjacent to said identified linear graph by an alphanumeric representation of said at least one metadata value;
wherein at least one other of said linear graphs is identified by said user, and each of said at least one other identified linear graphs is replaced by said corresponding two-dimensional graphs, and each of said metadata values adjacent to said at least one other identified linear graphs replaced by said two-dimensional graphs is represented in an alphanumeric form of representation, and
wherein said sorting sorts only said alphanumerically represented metadata values, and wherein said displaying displays only said alphanumerically represented metadata values and the corresponding two-dimensional graphs in the order resulting from said sorting.

12. The method of claim 9, further comprising:
providing an expanded display mode for each graph in which that graph is represented by a two-dimensional graph aligned along said first axis with said linear graph, said two-dimensional graph being characterized by a magnification along said second axis;
receiving input from a user identifying a first one of said linear graphs,
providing an expanded display in which said identified linear graph is replaced by said two-dimensional graph corresponding to that identified linear graph, said two-dimensional graph and said unidentified linear graphs remaining in said ordered sequence relative to one another; and replacing the graphical representation of said at least one metadata value, adjacent to said identified linear graph by an alphanumeric representation of said at least one metadata value;
wherein said sorting sorts only the metadata values that are graphically represented, and wherein said displaying displays only the metadata values graphically represented and the corresponding linear graphs, in the order resulting from said sorting.

13. The method of claim 9, further comprising:
providing an expanded display mode for each graph in which that graph is represented by a two-dimensional graph aligned along said first axis with said linear graph, said two-dimensional graph being characterized by a magnification along said second axis;
receiving input from a user identifying a first one of said linear graphs,
providing an expanded display in which said identified linear graph is replaced by said two-dimensional graph corresponding to that identified linear graph, said two-dimensional graph and said unidentified linear graphs remaining in said ordered sequence relative to one another;
replacing the graphical representation of said at least one metadata value, adjacent to said identified linear graph by an alphanumeric representation of said at least one metadata value;
selecting a second column of metadata values;
sorting the order of metadata values in the second column selected, starting from an order resulting from the sort performed in claim 4, wherein all other metadata columns and the associated graphs are rearranged in a same order as the sorted order of metadata values in the second selected column, after sorting with regard to the column selected in claim 4; and
displaying the metadata values and graphs in an order resulting from said sorting, based on said selecting said second-column of metadata values.

14. The method of claim 1, further comprising:
magnifying a portion of at least one of the straight lines representing a corresponding one of the graphs in a lens view to display that portion of said straight line in the lens view at a first scale along the second axis, increasing the width of said portion of said straight line so that the second values indicated by said portion of said straight line are more easily observed, said first scale being greater than a scale of the graphs that are not in the lens view, but in an unaltered scale along the first axis; and
displaying the at least one metadata value, adjacent each of the at least one of the graphs in the lens view at said first scale;
wherein said corresponding graph is unchanged in appearance by said magnification and display except for said increased line width.

15. The method of claim 14, wherein said displaying of said at least one magnified graph and said at least one scaled metadata value adjacent said magnified graph comprises:
displaying the at least one magnified graph and scaled metadata value in the lens view in a same order relative to the graphs that are not in the lens view and each other as occupied prior to said magnifying and scaling.

16. The method of claim 14, further comprising moving said lens view from a location of the at least one magnified graph, to another location over a different set of at least one graph, wherein the different set of at least one graph is magnified, and wherein any of the at least one graph previously magnified in the lens view of claim 9, but which are not in the another location, are displayed on a scale that is not magnified.

17. The method of claim 14, further comprising resizing the lens view to magnify greater or fewer graphs.

18. The method of claim 1, further comprising:
    selecting a graph;
    sorting the order of all graphs by similarity calculations between data in each graph, respectively, and data in the selected graph, wherein all other metadata values associated with the graphs are rearranged in a same order as the sorted order of graphs resulting from said sorting; and
    displaying the metadata values and graphs in said order resulting from said sorting.

19. The method of claim 18, wherein said similarity calculations are distance calculations.

20. The method of claim 1, further comprising;
    clustering the graphs into clusters based on a clustering algorithm, wherein all other metadata values associated with the graphs are rearranged with their associated graphs, into the clusters resulting from said clustering; and
    displaying the metadata values and graphs in an order resulting from said clustering.

21. The method of claim 20, further comprising displaying a graphical identifier of said clusters alongside said displayed graphs.

22. The method of claim 21, wherein said graphical identifier comprises a tree structure.

23. The method of claim 1, wherein said at least one metadata value characterizing each graph is located in one of a plurality of columns of metadata values, each column containing metadata values of a same category, relative to all of the other graphs, said method further comprising:
    filtering the graphs and associated metadata values to provide a selected set of graphs and associated metadata values, wherein the selected set consists of less than all of the graphs and associated metadata values;
    selecting one of said columns of metadata values from the selected set;
    sorting the order of metadata values in said selected column, wherein all other metadata columns and the associated graphs in the selected set are rearranged in a same order as the sorted order of metadata value in said selected column; and
    displaying the metadata values and graphs of the selected set in an order resulting from said sorting.

24. The method of claim 23, further comprising:
    providing an expanded display mode for each graph in which that graph is represented by a two-dimensional graph aligned along said first axis with said linear graph, said two-dimensional graph being characterized by a magnification along said second axis;
    receiving input from a user identifying a first one of said linear graphs,
    providing an expanded display in which said identified linear graph is replaced by said two-dimensional graph corresponding to that identified linear graph, said two-dimensional graph and said unidentified linear graphs remaining in said ordered sequence relative to one another; and
    replacing the graphical representation of said at least one metadata value, adjacent to said identified linear graph by an alphanumeric representation of said at least one metadata value;
    wherein said two-dimensional graph and said at least one associated metadata value in the selected set are sorted and displayed in an order resulting from said sorting with all the unidentified linear graphs and metadata values corresponding to those unidentified linear graphs in the selected set.

25. The method of claim 1, further comprising:
    filtering the graphs and associated metadata values to provide a selected set of graphs and associated metadata values, wherein the selected set consists of less than all of the graphs and associated metadata values;
    selecting at least a contiguous portion of a graph containing a plurality of data values in the selected set;
    sorting the order of the graphs in the selected set based upon the at least a contiguous portion of a selected graph, using a similarity sorting algorithm, wherein all other metadata values associated with the graphs are rearranged in a same order as the sorted order of graphs; and
    displaying the metadata values and graphs of the selected set in an order resulting from said sorting.

26. The method of claim 1, further comprising;
    filtering the graphs and associated metadata values to provide a selected set of graphs and associated metadata values, wherein the selected set consists of less than all of the graphs and associated metadata values;
    clustering the graphs in the selected set into clusters based on at least a corresponding portion of each of the graphs, wherein all other metadata values associated with the graphs in the selected set are rearranged with their associated graphs, respectively, into the clusters resulting from said clustering; and
    displaying the metadata values and graphs in an order resulting from said clustering.

27. The method of claim 1, wherein said at least one metadata value characterizing said graph is located in one of a plurality of columns of metadata values, each column containing metadata values of a same category, relative to all of the other graphs, said method further comprising:
    filtering the graphs and associated metadata values to provide a selected set of graphs and associated metadata values, wherein the selected set consists of less than all of the graphs and associated metadata values;
    selecting one of said columns of metadata values from the selected set;
    sorting the order of metadata values in said selected column, wherein all other metadata columns and the associated graphs in the selected set are rearranged in a same order as the sorted order of metadata values in said selected column; and
    displaying the metadata values and graphs of the selected set in an order resulting from said sorting.

28. The method of claim 1, wherein said graphs comprise plots of microarray data.

29. The method of claim 1, wherein said graphs comprise plots of aCGH data.

30. A computer readable medium carrying one or more sequences of instructions for visualizing a collection of graphs, each graph comprising an ordered set of pairs of values, each pair of values having a first value indicative of a quantity along a first axis and a second value indicative of a corresponding quantity along a second axis, wherein execution of one or more sequences of instructions by one or more processors causes the one or more processors to perform a process comprising:
    providing a compressed display mode for each graph in which that graph is represented by a linear graph comprising a straight line along said first axis, said straight line having a visual property that varies along said first axis according to said second values, providing a compressed display in which all of said graphs are displayed in said compressed display mode, said straight lines corresponding to each graph being aligned with respect to one another and being presented in an ordered sequence;

displaying for each linear graph at least one metadata value positioning said at least one metadata value adjacent to that linear graph, said metadata value being different from said values in that linear graph, wherein said at least one metadata value is represented by a graphical symbol having a dimension that varies according to said at least one metadata value.

31. A computer-implemented method of displaying a large dataset of microarray or aCGH data as a collection of graphs, each graph comprising an ordered set of pairs of values, each pair of values having a first value indicative of a first quantity along a first axis and a second value indicative of a second quantity along a second axis, said method comprising:

providing a compressed display mode for each graph in which that graph is represented by a linear graph comprising a straight line along said first axis, said straight line having a visual property that varies along said first axis according to said second values;

providing a compressed display in which all of said graphs are displayed in said compressed display mode, said straight lines corresponding to each graph being parallel to one another and being presented in an ordered sequence; wherein the graphs each display values for the same microarray or aCGH variables aligned along one of the first and second axes for a plurality of experiments aligned along the other of the first and second axes;

displaying for each linear graph at least one metadata value positioning said at least one metadata value adjacent to that linear graph, said metadata value being different from said values in that linear graph wherein said at least one metadata value is represented by a graphical symbol having a dimension that varies according to said at least one metadata value;

selecting a graph;

sorting the order of all graphs, using the computer, by similarity calculations between the data in each graph and the data in the selected graph, wherein all other metadata values associated with the graphs are rearranged in a same order as the sorted order of graphs; and displaying the metadata values and graphs in an order resulting from said sorting.

* * * * *

UNITED STATES PATENT AND TRADEMARK OFFICE
CERTIFICATE OF CORRECTION

| | |
|---|---|
| PATENT NO. | : 7,750,908 B2 |
| APPLICATION NO. | : 11/246743 |
| DATED | : July 6, 2010 |
| INVENTOR(S) | : Robert Kincaid et al. |

Page 1 of 1

It is certified that error appears in the above-identified patent and that said Letters Patent is hereby corrected as shown below:

In column 1, line 12, after "2004," insert -- pending, --.

In column 35, line 9, in Claim 18, delete "graph," and insert -- graph --, therefor.

In column 38, line 12, in Claim 31, delete "graph" and insert -- graph, --, therefor.

Signed and Sealed this

Twenty-fourth Day of August, 2010

David J. Kappos
*Director of the United States Patent and Trademark Office*